(12) United States Patent
Zheng et al.

(10) Patent No.: US 11,864,131 B2
(45) Date of Patent: Jan. 2, 2024

(54) MEASUREMENT CONFIGURATION METHOD AND APPARATUS

(71) Applicant: Huawei Technologies Co., Ltd., Shenzhen (CN)

(72) Inventors: Lili Zheng, Shanghai (CN); Hongping Zhang, Shanghai (CN); Qinghai Zeng, Shanghai (CN); Le Yan, Shenzhen (CN); Xingxing Hu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 385 days.

(21) Appl. No.: 17/170,524

(22) Filed: Feb. 8, 2021

(65) Prior Publication Data

US 2021/0160798 A1    May 27, 2021

Related U.S. Application Data

(63) Continuation of application No. PCT/CN2019/099704, filed on Aug. 8, 2019.

(30) Foreign Application Priority Data

Aug. 9, 2018   (CN) .......................... 201810903721.1

(51) Int. Cl.
*H04W 56/00* (2009.01)
*H04W 76/19* (2018.01)
(Continued)

(52) U.S. Cl.
CPC ......... *H04W 56/001* (2013.01); *H04W 24/10* (2013.01); *H04W 36/0058* (2018.08); *H04W 36/08* (2013.01); *H04W 76/19* (2018.02)

(58) Field of Classification Search
CPC ............... H04W 56/001; H04W 76/19; H04W 36/0058; H04W 24/10; H04W 36/08;
(Continued)

(56) References Cited

U.S. PATENT DOCUMENTS 10,070,330 B2   9/2018   You et al.
10,230,480 B2   3/2019   Li et al.
(Continued)

FOREIGN PATENT DOCUMENTS

CN   101651877 A   2/2010
CN   103581945 A   2/2014
(Continued)

OTHER PUBLICATIONS

ZTE Corporation, Sanechips ("SMTC configuration in asynchronous networks", 3GPP TSG-RAN WG2 Meeting #101, R2-1802022, Feb. 26-Mar. 2, 2018) (Year: 2018).*

(Continued)

*Primary Examiner* — Chi H Pham
*Assistant Examiner* — Ji-Hae Yea
(74) *Attorney, Agent, or Firm* — SLATER MATSIL, LLP

(57) ABSTRACT

This application provides a measurement configuration method and an apparatus. The method includes: determining that a serving cell changes from a first cell to a second cell; and updating or deleting a current measurement window configuration. The measurement window configuration is used to indicate a time domain position at which a terminal device measures a downlink reference signal. According to the solution provided in this application, when the serving cell of the terminal device changes, the current measurement window configuration of the terminal device is updated or deleted, so that a problem that the measurement window configuration of the terminal device is not applicable to measurement can be resolved to some extent.

18 Claims, 7 Drawing Sheets

(51) Int. Cl.
*H04W 36/00* (2009.01)
*H04W 24/10* (2009.01)
*H04W 36/08* (2009.01)

(58) Field of Classification Search
CPC ............. H04W 24/04; H04W 36/0083; H04W 36/0088; H04W 36/30; H04W 36/00833; H04W 36/00838; H04W 36/083; H04W 36/085; H04W 36/087; H04W 36/13; H04W 36/302; H04W 36/304
See application file for complete search history.

(56) References Cited

U.S. PATENT DOCUMENTS

| 10,531,355 | B2 | 1/2020 | Xu et al. |
| 2017/0020883 | A1 | 1/2017 | Rabbani et al. |

FOREIGN PATENT DOCUMENTS

| CN | 105101283 A | 11/2015 |
| CN | 105792243 A | 7/2016 |
| CN | 106233647 A | 12/2016 |
| CN | 106465173 A | 2/2017 |
| CN | 107005317 A | 8/2017 |
| CN | 108366379 A | 8/2018 |
| EP | 2361967 A1 | 8/2011 |
| GB | 412260 A | 6/1934 |
| KR | 20000052143 A | 8/2000 |
| WO | 2010007590 A2 | 1/2010 |
| WO | 2014195693 A1 | 12/2014 |

OTHER PUBLICATIONS

3GPP TS 38.331 V15.2.1 (3GPP; TSG-RAN; NR; RRC protocol specification (Release 15), Jun. 2018) (Year: 2018).*
ZTE Corporation et al., "SMTC configuration in asynchronous networks", 3GPP TSG-RAN WG2 Meeting #101, R2-1802022, Feb. 26-Mar. 2, 2018, 6 pages, Athens, Greece.
3GPP TS 36.423 V15.2.0 (Jun. 2018), 3rd Generation Partnership Project, Technical Specification Group Radio Access Network, Evolved Universal Terrestrial Radio Access Network (E-UTRAN), X2 application protocol (X2AP) (Release 15), 389 pages.
Nokia et al., "Measurement gap for intra-frequency measurement", 3GPP TSG-RAN WG4#85, R4-1713099, Nov. 27-Dec. 1, 2017, 4 pages, Reno, US.
3GPP TS 38.423 V15.0.0 (Jun. 2018), 3rd Generation Partnership Project, Technical Specification Group Radio Access Network, NG-RAN, XN application protocol (XnAP) (Release 15), 195 pages.
3GPP TS 38.473 V15.2.1 (Jul. 2018), 3rd Generation Partnership Project, Technical Specification Group Radio Access Network, NG-RAN, F1 application protocol (F1AP) (Release 15), 161 pages.
Huawei et al., "Correction on Measurement Timing Configuration", 3GPP TSG-RAN WG2#AH1807, R2-1810757, Jul. 2-6, 2018, 3 pages, Montreal, Canada.
3GPP TS 36.331 V15.2.2 (Jun. 2018), 3rd Generation Partnership Project, Technical Specification Group Radio Access Network, Evolved Universal Terrestrial Radio Access (E-UTRA), Radio Resource Control (RRC), Protocol specification (Release 15), 791 pages.
3GPP TS 38.133 V15.2.0 (Jun. 2018), 3rd Generation Partnership Project, Technical Specification Group Radio Access Network, NR, Requirements for support of radio resource management (Release 15), 79 pages.
3GPP TS 38.213 V15.2.0 (Jun. 2018), 3rd Generation Partnership Project, Technical Specification Group Radio Access Network, NR, Physical layer procedures for control (Release 15), 99 pages.
3GPP TS 38.215 V15.2.0 (Jun. 2018), 3rd Generation Partnership Project, Technical Specification Group Radio Access Network, NR, Physical layer measurements (Release 15), 15 pages.
3GPP TS 38.300 V15.2.0 (Jun. 2018), 3rd Generation Partnership Project, Technical Specification Group Radio Access Network, NR, NR and NG-RAN Overall Description, Stage 2 (Release 15), 87 pages.
3GPP TS 38.331 V15.2.1 (Jun. 2018), 3rd Generation Partnership Project, Technical Specification Group Radio Access Network, NR, Radio Resource Control (RRC) protocol specification (Release 15), 303 pages.
Intel Corporation, "Introduction of WLAN band indication", 3GPP TSG RAN WG3 Meeting #95, R3-170357, Feb. 13-17, 2017, 2 pages, Athens, Greece.

* cited by examiner

MEASUREMENT CONFIGURATION METHOD AND APPARATUS

CROSS-REFERENCE TO RELATED APPLICATIONS

This application is a continuation of International Application No. PCT/CN2019/099704, filed on Aug. 8, 2019, which claims priority to Chinese Patent Application No. 201810903721.1, filed on Aug. 9, 2018. The disclosures of the aforementioned applications are hereby incorporated by reference in their entireties.

TECHNICAL FIELD

This application relates to the communications field, and more specifically, to a measurement configuration method and an apparatus.

BACKGROUND

Mobility management is an important part in wireless mobile communications, and is a general term of related content involved to ensure that a communications link between a network device and user equipment (UE) is not interrupted due to movement of the UE. The mobility management is performed based on a measurement result of the UE.

The UE may perform measurement based on a measurement configuration, where the measurement configuration includes information required for the measurement. Currently, to avoid high power consumption caused by unnecessary search performed by the UE, the measurement configuration usually includes a measurement window configuration. A measurement window is a time window in which the UE performs measurement, that is, the UE only needs to perform measurement within the measurement window, and does not need to perform measurement outside the measurement window.

However, when a serving cell of the UE changes, currently there is no measurement window configuration processing solution.

SUMMARY

This application provides a measurement configuration method and an apparatus, to provide a measurement window configuration processing solution when a serving cell of a terminal device changes.

According to a first aspect, a measurement configuration method is provided. The method includes: determining that a serving cell changes from a first cell to a second cell; and updating or deleting a current measurement window configuration.

The measurement window configuration is used to indicate a time domain position at which a terminal device performs measurement, for example, a time domain position at which the terminal device measures a downlink reference signal. For example, the measurement window configuration indicates a window in which the terminal device performs measurement. For example, the terminal device may perform measurement in the window indicated by the measurement window configuration, and may not perform measurement outside the window.

For example, the measurement window configuration may include the following configuration information: a periodicity, an offset, and duration of the window. For example, the offset of the window uses a timing of the serving cell (for example, a primary cell) of the terminal device as a reference.

When the serving cell of the terminal device changes, this application provides a measurement window configuration processing solution, that is, updating or deleting the current measurement window configuration of the terminal device.

It should be understood that, when the serving cell of the terminal device changes, the current measurement window configuration of the terminal device is updated or deleted, to facilitate measurement of the cell by the terminal device.

The measurement window configuration mentioned in this specification may also be referred to as a measurement timing configuration. For example, the measurement window configuration is a synchronization signal/physical broadcast channel block-based measurement timing configuration (SMTC).

For another example, the measurement window configuration may alternatively be a configuration that is provided in a future evolved system and that is used to indicate a time domain position at which the terminal device measures a downlink reference signal. This is not limited in this application.

That the terminal device determines that the serving cell changes from the first cell to the second cell may include any one of the following cases: The terminal device determines that the serving cell is to change from the first cell to the second cell, the terminal device determines that the terminal device is in a process in which the serving cell of the terminal device changes from the first cell to the second cell, and the terminal device determines that the serving cell of the terminal device has changed from the first cell to the second cell.

For example, the terminal device may determine, in a cell handover scenario or an RRC connection re-establishment scenario, that the serving cell of the terminal device changes.

The current measurement window configuration is a measurement window configuration used by the terminal device when the serving cell is the first cell.

The current measurement window configuration may be configured by a network device to which the first cell belongs; or may be a measurement window configuration determined by the terminal device based on a timing offset between the cells; or may be a default measurement window configuration, for example, preconfigured by a network side or specified in a protocol. This is not limited in this application.

A network device, mentioned in this specification, to which a cell belongs is, for example, an access network device.

With reference to the first aspect, in a possible implementation of the first aspect, the updating a current measurement window configuration includes: receiving a new measurement window configuration; and updating the current measurement window configuration based on the new measurement window configuration.

For example, the new measurement window configuration may be received from the network side.

For example, the new measurement window configuration is determined based on a timing of the second cell.

According to the solution provided in this application, in a scenario in which the serving cell of the terminal device changes from the first cell to the second cell, a network device sends the new measurement window configuration to the terminal device, so that the terminal device updates the current measurement window configuration based on the new measurement window configuration. Therefore, according to the solution provided in this application, when the serving cell of the terminal device changes, it can be ensured, to some extent, that the measurement window configuration of the terminal device is applicable to a current measurement task.

With reference to the first aspect, in a possible implementation of the first aspect, the updating a current measurement window configuration includes: obtaining a timing offset between the second cell and the first cell; and updating the current measurement window configuration based on the timing offset.

According to the solution provided in this application, in a scenario in which the serving cell of the terminal device changes from the first cell to the second cell, the terminal device updates the current measurement window configuration based on the timing offset between the second cell and the first cell, so that an updated measurement window configuration is more suitable for a current measurement task. Therefore, according to the solution provided in this application, when the serving cell of the terminal device changes, it can be ensured, to some extent, that the measurement window configuration of the terminal device is applicable to the current measurement task.

With reference to the first aspect, in a possible implementation of the first aspect, the determining that a serving cell changes from a first cell to a second cell includes: determining, based on a handover command, that the serving cell is handed over from the first cell to the second cell; and the receiving a new measurement window configuration includes: receiving the new measurement window configuration from a network device to which the first cell belongs or from a network device to which the second cell belongs.

For example, an RRC reconfiguration message may be received, where the RRC reconfiguration message is used to indicate to perform cell handover; and it is determined, based on the RRC reconfiguration message, that the serving cell is handed over from the first cell to the second cell.

With reference to the first aspect, in a possible implementation of the first aspect, the determining that a serving cell changes from a first cell to a second cell includes: triggering radio resource control RRC connection re-establishment, so that the serving cell changes from the first cell to the second cell; and the receiving a new measurement window configuration includes: receiving the new measurement window configuration from a network device to which the second cell belongs.

With reference to the first aspect, in a possible implementation of the first aspect, the new measurement window configuration is included in an RRC reconfiguration message.

Optionally, the new measurement window configuration may alternatively be delivered to the terminal device by using other downlink signaling.

Optionally, in some of the foregoing implementations, the updating a current measurement window configuration may include the following several cases.

(1) Updating an offset of a window indicated by the current measurement window configuration based on the timing offset between the second cell and the first cell For example, if the measurement window configuration is the SMTC, the SMTC may be updated by updating an offset of an SMTC window. For example, in a current protocol, a periodicityAndOffset field defines a periodicity and an offset of the SMTC window, and a duration field defines a length of the SMTC window. In this case, the SMTC may be updated by updating the periodicityAndOffset field.

(2) Replacing the Current Measurement Window Configuration with a New Measurement Window Configuration For example, the new measurement window configuration is obtained from the network side.

For another example, the new measurement window configuration is a default measurement window configuration. The default measurement window configuration mentioned in this specification may be a measurement window configuration preconfigured by the network side, or may be a measurement window configuration specified in the protocol.

(3) Obtaining a measurement object configuration including a new measurement window configuration from the network side, and replacing a measurement object configuration in which the current measurement window configuration is located with the measurement object configuration delivered by the network side Optionally, in some of the foregoing implementations, the deleting a current measurement window configuration includes the following several cases.

(1) Deleting the Current Measurement Window Configuration

Optionally, the deleting the current measurement window configuration includes: receiving indication information, where the indication information is used to indicate to delete the current measurement window configuration; and deleting the current measurement window configuration based on the indication information.

The indication information may be explicit indication information or implicit indication information.

(2) Deleting a Measurement Object Configuration in which the Current Measurement Window Configuration is Located Optionally, the deleting a measurement object configuration in which the current measurement window configuration is located includes: receiving indication information, where the indication information is used to indicate to delete the measurement object configuration in which the current measurement window configuration is located; and deleting, based on the indication information, the measurement object configuration in which the current measurement window configuration is located.

The indication information may be explicit indication information or implicit indication information.

Optionally, in some of the foregoing implementations, the updating a current measurement window configuration includes: using a new measurement window configuration after the current measurement window configuration is deleted; or using a measurement object configuration including a new measurement window configuration after a measurement object configuration in which the current measurement window configuration is located is deleted.

With reference to the first aspect, in a possible implementation of the first aspect, the updating or deleting a current measurement window configuration includes: receiving a new measurement window configuration, where the new measurement window configuration corresponds to a part of configuration information in the current measurement window configuration; updating the part of configuration information in the current measurement window configuration based on the new measurement window configuration; and deleting or updating other configuration information in the current measurement window configuration.

For example, the part of configuration information in the current measurement window configuration may be updated based on the new measurement window configuration in any one of the foregoing described update manners.

Optionally, in this implementation, the updating other configuration information in the current measurement window configuration includes: obtaining a timing offset between the first cell and the second cell; and updating the other configuration information in the current measurement window configuration based on the timing offset.

Optionally, the updating other configuration information in the current measurement window configuration includes: replacing the other configuration information in the current measurement window configuration based on a default measurement window configuration.

With reference to the first aspect, in a possible implementation of the first aspect, the current measurement window configuration is configured by the network device to which the first cell belongs.

With reference to the first aspect, in a possible implementation of the first aspect, the measurement window configuration is an SMTC.

According to a second aspect, a measurement configuration method is provided. The method includes: when a serving cell of a terminal device changes from a first cell to a second cell, determining a new measurement window configuration of the terminal device based on a timing of the second cell; and sending the new measurement window configuration to the terminal device.

With reference to the second aspect, in a possible implementation of the second aspect, before the sending the new measurement window configuration to the terminal device, the method further includes: sending, to the terminal device, indication information used to indicate to delete a current measurement window configuration of the terminal device.

For example, the indication information may be delivered to the terminal device by using an RRC reconfiguration message.

Optionally, the indication information may be explicit indication information or implicit indication information.

With reference to the second aspect, in a possible implementation of the second aspect, the sending the new measurement window configuration to the terminal device includes: sending an RRC reconfiguration message to the terminal device, where the RRC reconfiguration message carries the new measurement window configuration.

With reference to the second aspect, in a possible implementation of the second aspect, the measurement window configuration is an SMTC.

With reference to the second aspect, in a possible implementation of the second aspect, that a serving cell of a terminal device changes from a first cell to a second cell includes: The terminal device performs cell handover; or the terminal device performs RRC connection re-establishment.

According to a third aspect, a communications apparatus is provided. The communications apparatus is configured to perform the method according to any one of the first aspect or the possible implementations of the first aspect. Optionally, the communications apparatus may include modules configured to perform the method according to any one of the first aspect or the possible implementations of the first aspect.

According to a fourth aspect, a communications apparatus is provided. The communications apparatus is configured to perform the method according to any one of the second aspect or the possible implementations of the second aspect. Optionally, the communications apparatus may include modules configured to perform the method according to any one of the second aspect or the possible implementations of the second aspect.

According to a fifth aspect, a communications apparatus is provided. The communications apparatus includes a memory and a processor, the memory is configured to store an instruction, the processor is configured to execute the instruction stored in the memory, and execution of the instruction stored in the memory enables the processor to perform the method according to any one of the first aspect or the possible implementations of the first aspect.

According to a sixth aspect, a communications apparatus is provided. The communications apparatus includes a memory and a processor, the memory is configured to store an instruction, the processor is configured to execute the instruction stored in the memory, and execution of the instruction stored in the memory enables the processor to perform the method according to any one of the second aspect or the possible implementations of the second aspect.

According to a seventh aspect, a chip is provided. The chip includes a processing module and a communications interface, the processing module is configured to control the communications interface to communicate with the outside, and the processing module is further configured to implement the method according to any one of the first aspect or the possible implementations of the first aspect.

According to an eighth aspect, a chip is provided. The chip includes a processing module and a communications interface, the processing module is configured to control the communications interface to communicate with the outside, and the processing module is further configured to implement the method according to any one of the second aspect or the possible implementations of the second aspect.

According to a ninth aspect, a computer-readable storage medium is provided. The computer-readable storage medium stores a computer program; and when the computer program is executed by a computer, the computer is enabled to implement the method according to any one of the first aspect or the possible implementations of the first aspect.

According to a tenth aspect, a computer-readable storage medium is provided. The computer-readable storage medium stores a computer program; and when the computer program is executed by a computer, the computer is enabled to implement the method according to any one of the second aspect or the possible implementations of the second aspect.

According to an eleventh aspect, a computer program product including an instruction is provided. When the instruction is executed by a computer, the computer is enabled to implement the method according to any one of the first aspect or the possible implementations of the first aspect.

According to a twelfth aspect, a computer program product including an instruction is provided. When the instruction is executed by a computer, the computer is enabled to implement the method according to any one of the second aspect or the possible implementations of the second aspect.

DETAILED DESCRIPTION OF ILLUSTRATIVE EMBODIMENTS

The following describes the technical solutions of this application with reference to the accompanying drawings.

The technical solutions in the embodiments of this application may be used in various communications systems, for example, a 5th generation (5G) system, a new radio (NR) system, a machine to machine (M2M) communications system, or another future evolved communications system. This is not limited in the embodiments of this application.

A terminal device in the embodiments of this application may be user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a future evolved public land mobile network (PLMN), or the like. This is not limited in the embodiments of this application.

A network device in the embodiments of this application may be a device configured to communicate with the terminal device, and may be any device having a wireless transceiver function or a chip that can be disposed in the device. The network device may be a base station. The base station may be configured to communicate with one or more terminals, or may be configured to communicate with one or more base stations having some terminal functions (for example, communication between a macro base station and a micro base station). The network device may be an evolved NodeB (eNB) in a long term evolution (LTE) system, or a base station in a 5G system or an NR system. In addition, the network device may alternatively be an access point (AP), a transmission node (TRP), a central unit (CU), or another network entity, and may include some or all of functions of the foregoing network entities. This is not limited in the embodiments of this application.

Figure 1:
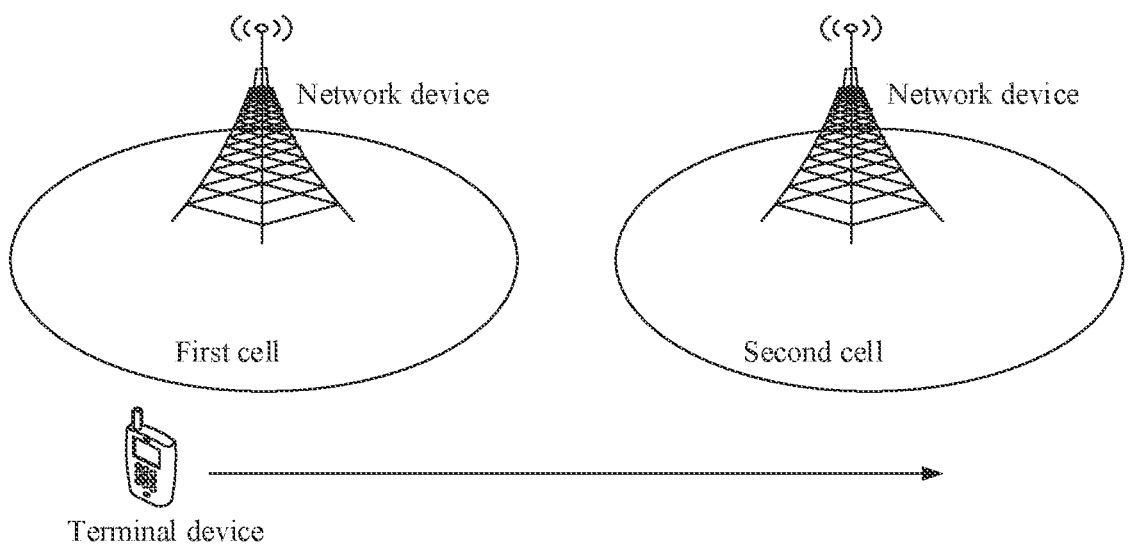
FIG. 1 is a schematic diagram of an application scenario according to an embodiment of this application.

FIG. 1 is a schematic diagram of an application scenario according to an embodiment of this application. A serving cell of a terminal device changes from a first cell to a second cell. The first cell may also be referred to as a source cell, and the second cell is referred to as a target cell. Correspondingly, a network device to which the first cell belongs may be referred to as a source network device (for example, a source eNB), and a network device to which the second cell belongs is referred to as a target network device (for example, a target eNB).

Optionally, the application scenario according to this embodiment of this application may be a cell handover scenario, or may be a radio resource control (RRC) connection re-establishment scenario.

Byway of example, and not limitation, the following first briefly describes the two scenarios.

Scenario 1: Cell Handover

The cell handover is a process in which a serving cell of a terminal device in a connected state changes. It is assumed that FIG. 1 shows the cell handover scenario. Through cell handover, the serving cell of the terminal device is handed over from the first cell to the second cell.

Figure 2:
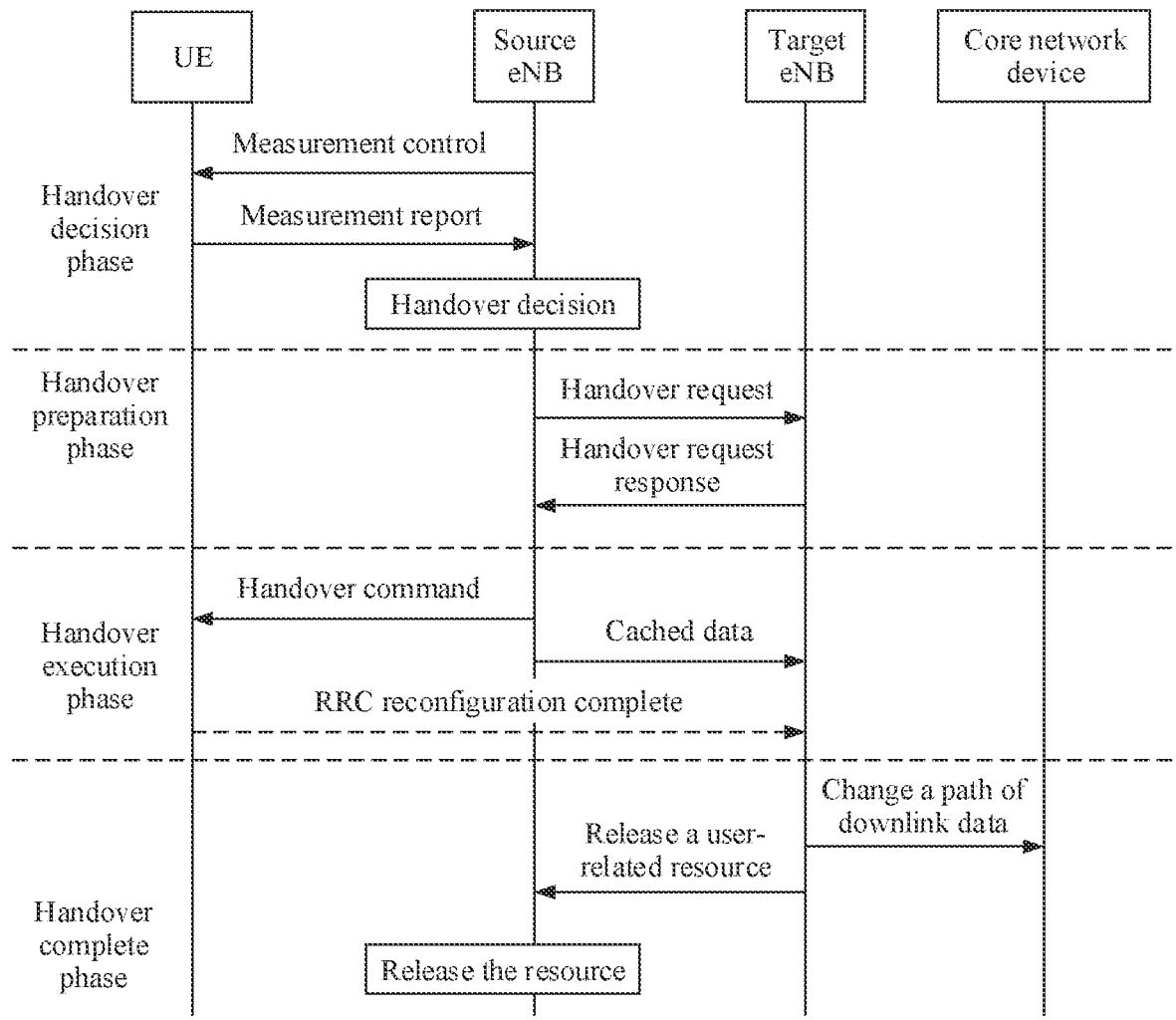
FIG. 2 is a schematic diagram of a cell handover procedure.

By way of example, and not limitation, FIG. 2 is a schematic flowchart of cell handover. A cell handover procedure may be divided into four phases, and the four phases are sequentially a handover decision phase, a handover preparation phase, a handover execution phase, and a handover complete phase. In FIG. 2, an example in which a terminal device is UE and a network device is an eNB is used for description. A process ended with handover decision of a source eNB is referred to as the handover decision phase. In the handover decision phase, the source eNB sends a measurement control message to the UE, to control the UE to perform measurement and reporting. The source eNB receives a measurement report reported by the UE, and performs the handover decision based on the measurement result reported by the UE. A process from the source eNB sending a handover request to a target eNB to the target eNB sending a handover request response (handover request ack) to the source eNB is referred to as the handover preparation phase. The handover preparation phase is a process in which a network side prepares a resource for the UE. The handover execution phase is a process in which the source eNB delivers a handover command (RRC connection reconfiguration, RRC Conn. Reconf.) to the UE, to control the UE to access the target eNB; the source eNB forwards cached data (SN Status Transfer and Data Forwarding) to the target eNB; and the UE sends a RRC reconfiguration complete (RRC Conn. Reconf. Complete) message to the target eNB. The handover complete phase is a process in which the target eNB indicates a core network device to change a path of downlink data (DL path switch), and indicates the source eNB to release a user-related resource (release resources).

Scenario 2: RRC Connection Re-Establishment

The terminal device may autonomously trigger the RRC connection re-establishment, so that the serving cell of the terminal device changes from the first cell to the second cell.

An RRC connection re-establishment procedure includes restoration of a signaling bearer (signaling radio bearer, SRB) and re-activation of security.

For example, the terminal device initiates the RRC connection re-establishment to a network device (corresponding to the network device to which the second cell belongs in FIG. 1) that stores a context of the terminal device; and after the SRB is re-established, reconfigures a radio bearer, and maintains an original security algorithm. The RRC connection re-establishment can only be performed on a terminal device on which security has been activated.

A scenario in which the terminal device triggers the RRC connection re-establishment includes but is not limited to any one of the following: a cell handover failure, a link failure, a reconfiguration failure, or an integrity check failure.

The embodiments of this application relate to a measurement configuration. To better understand the embodiments of this application, the following briefly describes concepts related to the measurement configuration, including mobility management, measurement of a terminal device, a measurement configuration, and a synchronization signal/physical broadcast channel block-based measurement timing configuration (SMTC) in the measurement configuration.

It should be noted that the following descriptions of the mobility management, the measurement of the terminal device, the measurement configuration, and the SMTC are merely intended to better understand the technical solutions of this application, and do not constitute any limitation on the technical solutions of this application.

(1) Mobility Management

The mobility management is an important part of wireless mobile communications. The mobility management is a general term of related content involved to ensure that a communications link between a network device and a terminal device is not interrupted due to movement of the terminal device.

Based on a status of the terminal device, the mobility management may be classified into two types for example: idle state (RRC_IDLE state) mobility management and connected state (RRC_CONNECTED state) mobility management. For a terminal device in an idle state, the mobility management is mainly a cell selection/reselection process. For a terminal device in a connected state, the mobility management is mainly a cell handover process. As shown in FIG. 2, the mobility management of the terminal device in the connected state is provided by a network device, that is, the network device controls a cell to which the terminal device is to be handed over and how to perform handover.

Both the cell selection/reselection and the cell handover are performed based on a measurement result reported by the terminal device. For example, in the cell handover procedure shown in FIG. 2, the network side determines mobility of the terminal device based on measurement reporting of the terminal device, that is, determines whether the terminal device needs to perform cell handover and how to perform handover. In other words, measurement of the terminal device is a basis of the mobility management.

(2) Measurement of a Terminal Device

Based on protocol layers involved in the measurement, the measurement of the terminal device may be divided into two parts: physical layer measurement (that is, layer 1 measurement) and RRC layer measurement (that is, layer 3 measurement).

In a possible manner, at a physical layer, the terminal device performs measurement of a specified type on a configured measurement resource. For measurement based on a synchronization signal/physical broadcast channel block (SSB), the terminal device combines measurement results obtained on a plurality of SSBs that have a same SSB index and a same physical cell identifier (PCI), to obtain a beam-level layer 1 measurement result that is of a cell corresponding to the PCI and that corresponds to the SSB index; and reports the beam-level layer 1 measurement result to a layer 3. For measurement based on a channel state information reference signal (CSI-RS), the terminal device combines measurement results obtained on a plurality of CSI-RS resources that have a same CSI-RS resource identifier and a same PCI, to obtain a beam-level layer 1 measurement result that is of a cell corresponding to the PCI and that corresponds to the CSI-RS resource identifier; and reports the beam-level layer 1 measurement result to a layer 3.

The foregoing process of combining measurement results on a plurality of measurement resources (for example, the foregoing SSB resources and CSI-RS resources) may be referred to as layer 1 filtering.

After the layer 3 receives the beam-level measurement result reported by a layer 1, the terminal device needs to select/combine layer 1 measurement results of beams in a same cell, to derive a cell-level layer 3 measurement result. Then, layer 3 filtering needs to be further performed on the obtained cell-level layer 3 measurement result. A measurement result obtained after the layer 3 filtering is verified, to determine whether the measurement result meets a reporting trigger condition, and if the measurement result meets the reporting trigger condition, the measurement result is eventually reported.

Optionally, based on a configuration, the terminal device may also need to report a beam (beam)-level layer 3 measurement result. In this case, the terminal device directly performs layer 3 filtering on the layer 1 measurement results of the beams, and then selects, from measurement results obtained after the layer 3 filtering, a measurement result to be reported, for reporting.

The beam mentioned in this specification may be understood as a spatial resource, and may be a transmit or receive precoding vector having an energy transmission directivity. The transmit or receive precoding vector can be identified by using index information, and the index information may be a correspondingly configured resource identifier (ID) of the terminal device. For example, the index information may be a correspondingly configured identifier or resource of a CSI-RS; or may be a correspondingly configured identifier or resource of a synchronization signal/physical broadcast channel block (SS (synchronization signal)/PBCH Block, SSB); or may be a correspondingly configured identifier or resource of an uplink sounding reference signal (SRS).

Optionally, the index information may alternatively be explicitly or implicitly carried by a signal or a channel that is carried by a beam. The energy transmission directivity may mean that the precoding vector is used to perform precoding processing on a signal that needs to be sent, so that the signal obtained after the precoding processing has a specific spatial directivity, and that a received signal obtained after the precoding processing is performed by using the precoding vector has relatively good received power, for example, meets a received demodulation signal-to-noise ratio. The energy transmission directivity may also mean that same signals sent from different spatial positions and received by using the precoding vector have different received power.

Optionally, a same communications apparatus (for example, a terminal device or a network device) may have different precoding vectors, and different devices may also have different precoding vectors, that is, correspond to different beams. For a configuration or a capability of a communications apparatus, one communications apparatus may simultaneously use one or more of a plurality of different precoding vectors, that is, may form one or more beams at the same time.

Usually, when a new cell-level measurement result is generated, the terminal device verifies whether the measurement result meets the reporting trigger condition. When the reporting trigger condition is met, the terminal device needs to send the measurement report to a network device.

(3) Measurement Configuration

A terminal device performs measurement based on the measurement configuration. In other words, before the terminal device performs the measurement, a measurement configuration phase is also included.

In the measurement configuration phase, a network device sends, to the terminal device by using downlink signaling, information required for the measurement. For example, in a connected state, the network device delivers the measurement configuration to the terminal device by using an RRC reconfiguration message (RRC reconfiguration). The RRC reconfiguration message includes a measurement configuration (measConfig) information element, and the measurement configuration information element includes measurement configuration information to be sent to the terminal device.

Figure 3:
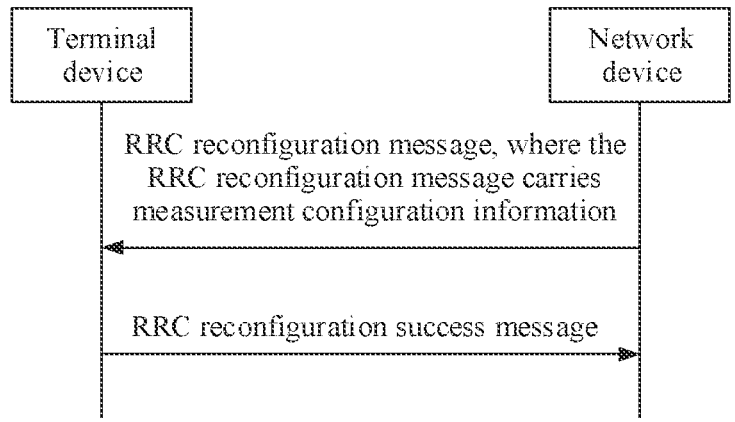
FIG. 3 is a schematic diagram in which a network device delivers a measurement configuration to a terminal device.

By way of example, and not limitation, FIG. 3 is a schematic diagram in which a network device delivers a measurement configuration to a terminal device. The network device (a network device to which a serving cell of the terminal device belongs) sends an RRC reconfiguration message to the terminal device, where the RRC reconfiguration message carries measurement configuration information; and after receiving the RRC reconfiguration message, the terminal device correspondingly modifies a measurement configuration database and a measurement report list of the terminal device based on the measurement configuration information carried in the RRC reconfiguration message, and sends a modification success message to the network device, for example, an RRC reconfiguration success message (RRC reconfiguration complete) shown in FIG. 3.

The measurement configuration information may include the following configuration information.

(a) Measurement Object (MO) Configuration

An MO indicates an object measured by the terminal device.

For example, for intra-frequency and inter-frequency measurement, an MO indicates a frequency domain/time domain position and a subcarrier spacing of a reference signal that are to be measured.

For another example, a measurement object ID (measObjectId) of an MO corresponding to each serving cell is indicated in a servingCellMO field configured for the serving cell.

For another example, for inter-RAT measurement, an MO corresponds to an evolved UMTS terrestrial radio access (EUTRA) carrier frequency.

(b) Reporting Configuration

In the reporting configuration, the network device notifies the terminal device of details of the to-be-performed measurement, for example, a type of the measurement, a reporting trigger manner, and a reporting format.

(c) Measurement Quantity Configuration

The measurement quantity configuration is a configuration of a layer 3 filtering coefficient. Before a measurement quantity is triggered for verifying whether the reporting trigger condition is met and before the measurement quantity is eventually reported, layer 3 filtering is performed on the measurement quantity. The layer 3 filtering coefficient may be notified to the terminal device by using the measurement quantity configuration.

(d) Measurement Identifier Configuration

Figure 4:
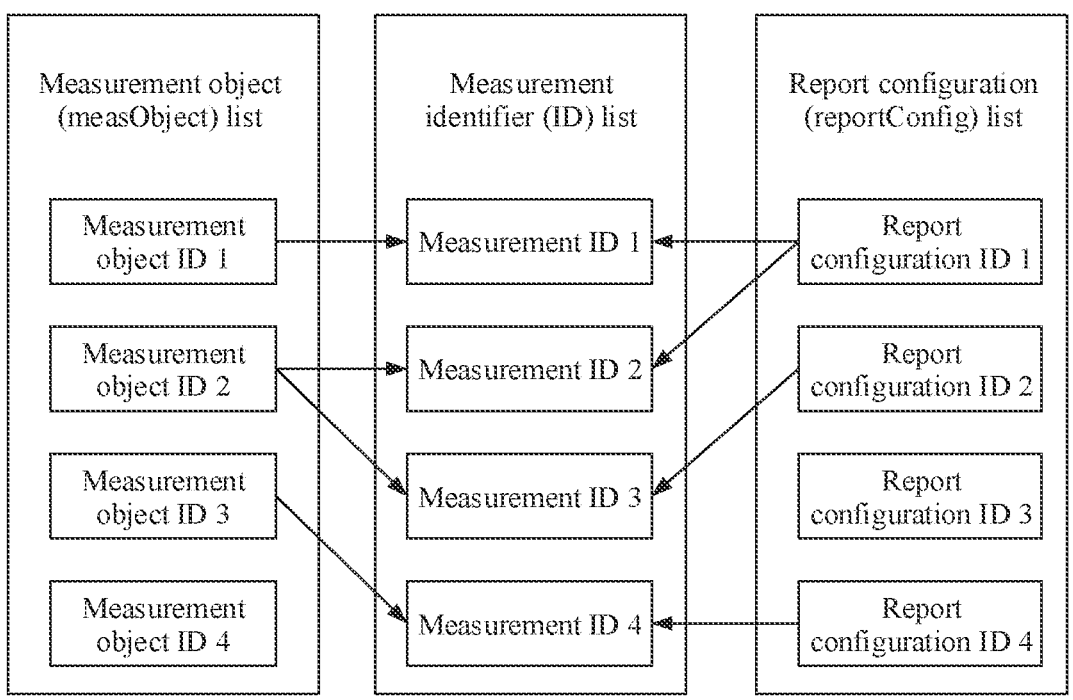
FIG. 4 is a schematic diagram of a relationship among a measurement object, a measurement identifier, and a report configuration in a measurement configuration.

A measurement identifier is a combination of a measurement object and a reporting configuration. The combination of the measurement object and the reporting configuration determines various measurement details of the measurement object. Any measurement object/reporting configuration may be associated with any one/plurality of/zero report configurations/measurement objects that have a same radio access technology (RAT) type with the measurement object/reporting configuration. FIG. 4 shows an example used to indicate a relationship among a measurement identifier, a measurement object, and a reporting configuration.

(e) Measurement Interval Configuration

The measurement interval configuration is optional. If intra-frequency/inter-frequency/inter-RAT measurement involves a handover center frequency, the intra-frequency/inter-frequency/inter-RAT measurement and data transmission cannot be performed at the same time, and the network device needs to configure a measurement interval for the terminal device.

(4) SMTC

The SMTC is also included in the (a) measurement object configuration mentioned above. The SMTC indicates a window that is configured by a network device for a terminal device and that is used to perform SSB-based measurement. The terminal device needs to perform SSB-based measurement only in the window indicated by the SMTC, and does not need to perform SSB-based measurement outside the window indicated by the SMTC.

For example, configuration parameters of the SMTC window (the window indicated by the SMTC) include an SMTC timing and SMTC duration, where the SMTC timing includes information about a periodicity and an offset of the SMTC window. Alternatively, in other words, the configuration parameters of the SMTC window include a periodicity of the SMTC window, an offset of the SMTC window, and SMTC duration.

In an optional implementation, the periodicity of the SMTC window may be 5, 10, 20, 40, 80, or 16 ms. In each periodicity, the offset of the SMTC window may take, for example, any value from 0 to the periodicity of the SMTC window-1 ms at a granularity of 1 ms. A boundary of the SMTC window is aligned with a subframe boundary of a cell of configuration measurement. The duration of the SMTC window indicates a length of the SMTC window. For example, a granularity of the length of the SMTC window is also 1 ms, and the length may be 1, 2, 3, 4, or 5 ms. For another example, a granularity unit of the length of the SMTC window may alternatively be another length unit.

It should be understood that the foregoing description of the SMTC is merely used as an example instead of a limitation. In a future evolved technology, the SMTC may have other definitions and explanations. This is not limited in this application.

For example, for intra-frequency measurement in a connected state, the network device may configure a maximum of two SMTC windows for the terminal device on one serving frequency. In other words, a measurement object that may be configured by the network device for the terminal device on one serving frequency includes a maximum of two SMTCs. For inter-frequency measurement in the connected state or measurement in an idle state, the network device may configure a maximum of one SMTC window for the terminal device on one serving frequency.

For example, for the intra-frequency measurement in the connected state, the maximum of two SMTC windows configured by the network device for the terminal device may have different periodicities, but have a same offset and a same length. The network device may notify, by using a configuration, the terminal device of an SMTC window to which each cell on one serving frequency is applicable. For a cell, if the network device does not explicitly indicate an SMTC window to which the cell is applicable, the cell should be applicable to an SMTC window with a longer periodicity.

It is found that, in a current standard, the SMTC timing is related to a timing of a special cell (SpCell) of the terminal device, where the SpCell may be a primary cell (PCell) or a primary secondary cell (PSCell).

In the scenario shown in FIG. 1, when the serving cell of the terminal device changes, a timing of the terminal device may change.

When a serving cell of UE changes, currently there is no measurement window configuration processing solution.

This application provides a measurement configuration method and an apparatus, to resolve a problem that a measurement configuration of a terminal device is not applicable to a current measurement task when a serving cell of the terminal device changes.

Figure 5:
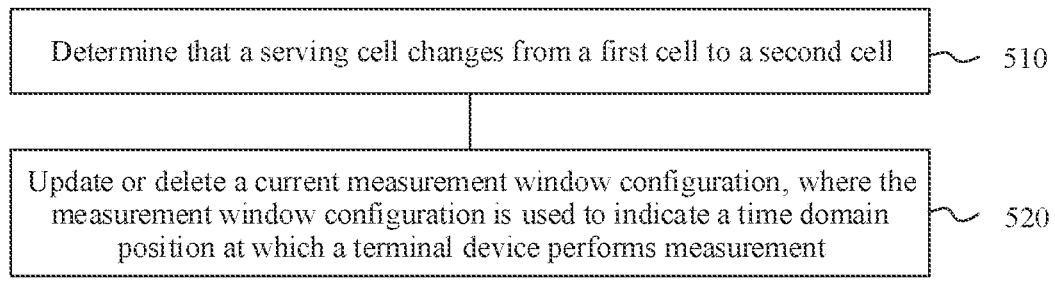
FIG. 5 is a schematic flowchart of a measurement configuration method according to an embodiment of this application.

FIG. 5 is a schematic flowchart of a measurement configuration method according to an embodiment of this application. For example, the method may be implemented by a terminal device, or may be implemented by a chip that may be used in a terminal device. As shown in FIG. 5, the measurement configuration method provided in this embodiment of this application includes the following steps. An example in which an execution body is a terminal device is used for description.

510: The terminal device determines that a serving cell changes from a first cell to a second cell.

That the terminal device determines that a serving cell changes from a first cell to a second cell may include any one of the following cases: The terminal device determines that the serving cell is to change from the first cell to the second cell, the terminal device determines that the terminal device is in a process in which the serving cell of the terminal device changes from the first cell to the second cell, and the terminal device determines that the serving cell of the terminal device has changed from the first cell to the second cell.

For example, the terminal device determines, in a cell handover scenario or an RRC connection re-establishment scenario, that the serving cell of the terminal device changes.

Optionally, the terminal device determines, based on a handover command, that the serving cell is handed over from the first cell to the second cell.

For example, in the handover execution phase shown in FIG. 2, the terminal device receives an RRC reconfiguration message sent by a network device, where the RRC reconfiguration message is used to indicate the terminal device to perform cell handover; and the terminal device determines, based on the received RRC reconfiguration message, that the serving cell of the terminal device is to be handed over from the first cell to the second cell.

For example, a part of fields in the RRC reconfiguration message may be used to indicate the terminal device to perform the cell handover. In this embodiment of this application, a field that is used to indicate the terminal to perform the cell handover may be referred to as a handover command.

Optionally, the terminal device triggers RRC connection re-establishment, so that the serving cell of the terminal device changes from the first cell to the second cell.

For example, the terminal device actively triggers an RRC connection re-establishment procedure, so that the serving cell of the terminal device changes.

In a possible manner, the first cell may be referred to as a source cell, and the second cell may be referred to as a target cell. Correspondingly, a network device to which the first cell belongs may be referred to as a source network device, and a network device to which the second cell belongs may be referred to as a target network device.

A network device, mentioned in this specification, to which a cell belongs is, for example, an access network device.

Optionally, the first cell and the second cell may be served by different nodes, that is, the network device to which the first cell belongs is different from the network device to which the second cell belongs.

Optionally, the first cell and the second cell may alternatively be served by a same node, that is, the network device to which the first cell belongs is the same as the network device to which the second cell belongs.

520: The terminal device updates or deletes a current measurement window configuration, where the measurement window configuration is used to indicate a time domain position at which the terminal device performs measurement.

The measurement window configuration mentioned in this specification is used to indicate a time domain position at which the terminal device measures a downlink reference signal.

For example, the downlink reference signal includes but is not limited to an SSB or a CSI-RS.

For example, the terminal device performs measurement in a window indicated by the measurement window configuration, and does not perform measurement outside the window indicated by the measurement window configuration.

Optionally, in an implementation, in step 520, the terminal device updates the current measurement window configuration.

For example, the current measurement window configuration is updated, so that an updated measurement window configuration is applicable to measurement in a scenario in which the serving cell changes.

In this case, the terminal device may perform the measurement based on the updated measurement window configuration. For a specific measurement method, refer to the foregoing descriptions about the measurement of the terminal device. Details are not described herein again.

The following describes in detail a specific solution in which the terminal device updates the current measurement window configuration.

Optionally, in another implementation, in step 520, the terminal device deletes the current measurement window configuration.

In this case, for example, the terminal device may suspend measurement of a part of cells.

It should be understood that when the serving cell changes, the measurement of the part of cells is suspended, so that unnecessary power consumption of the terminal device can be avoided.

The following describes in detail a specific solution in which the terminal device deletes the current measurement window configuration.

Optionally, after deleting the current measurement window configuration, the terminal device may further obtain a new measurement window configuration from a network device side, and use the new measurement window configuration.

In this case, although the current measurement window configuration is deleted, the terminal device may continue to perform the measurement based on the new measurement window configuration. For a specific measurement method, refer to the foregoing descriptions about the measurement of the terminal device. Details are not described herein again.

Therefore, for a scenario in which the serving cell of the terminal device changes, this embodiment of this application provides a measurement window configuration processing solution, that is, updating or deleting the current measurement window configuration.

It should be understood that, when the serving cell of the terminal device changes, the current measurement window configuration of the terminal device is updated or deleted, to facilitate measurement of the cell by the terminal device. For example, when the serving cell of the terminal device changes, the current measurement window configuration of the terminal device is updated, so that a problem that the current measurement window configuration of the terminal device is not applicable to a current measurement task can be resolved to some extent. For another example, when the serving cell of the terminal device changes, the current measurement window configuration of the terminal device is deleted, so that unnecessary power consumption of the terminal device can be avoided.

The measurement window configuration mentioned in this specification may also be referred to as a measurement timing configuration.

Optionally, the measurement window configuration may be a measurement window configuration for an SSB, that is, the measurement window configuration may be referred to as an SMTC.

Optionally, the measurement window configuration may be a measurement window configuration for a CSI-RS.

Optionally, the measurement window configuration may be a measurement window configuration for an SSB and a CSI-RS.

Optionally, the measurement window configuration may alternatively be a measurement window configuration for one or more other downlink reference signals.

It should be understood that in a future evolved system, a new name may be assigned to the measurement window configuration. This is not limited in this embodiment of this application.

The current measurement window configuration of the terminal device is a measurement window configuration used by the terminal device when the serving cell is the first cell.

Optionally, the current measurement window configuration may be configured by the network device to which the first cell belongs.

Optionally, the current measurement window configuration may alternatively be determined by the terminal device based on a timing offset between the cells.

Optionally, the current measurement window configuration may alternatively be a default measurement window configuration.

The default measurement window configuration is preconfigured by a network side or specified in a protocol. This is not limited in this embodiment of this application.

In this embodiment of this application, when the serving cell of the terminal device changes, the terminal device processes the current measurement window configuration. Specific processing manners include update and deletion. The following describes the two processing manners and a combination of the two processing manners.

Optionally, in step 520, the current measurement window configuration is updated.

The current measurement window configuration may be updated in a plurality of manners.

Figure 6:
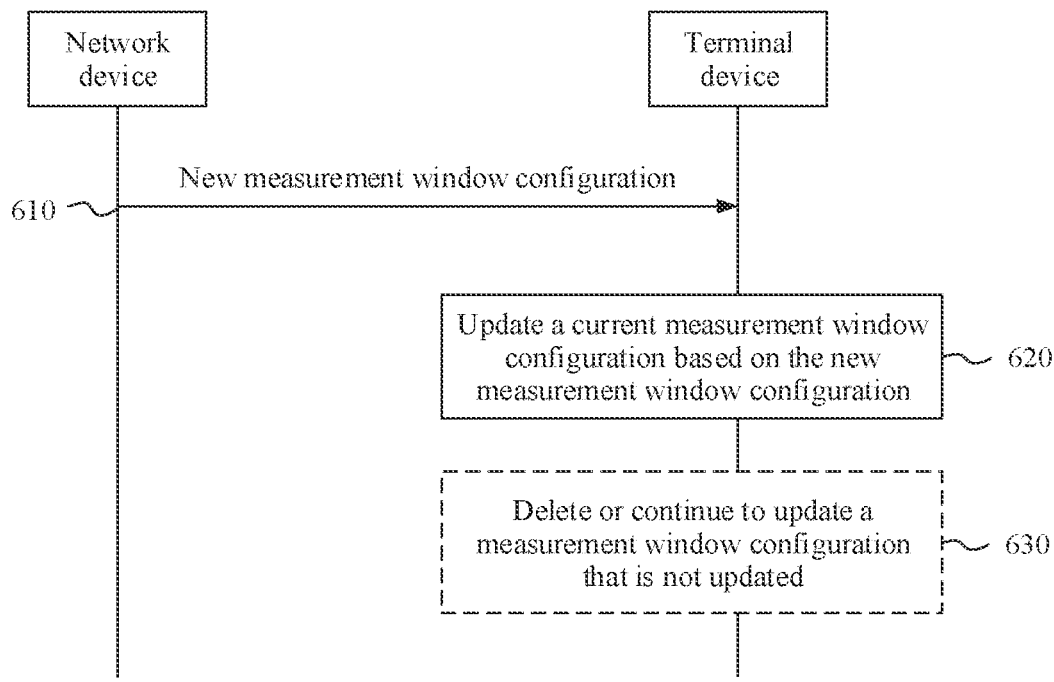
FIG. 6 is another schematic flowchart of a measurement configuration method according to an embodiment of this application.

Optionally, in a first update manner, as shown in FIG. 6, the current measurement window configuration is updated through step 610 and step 620.

610: The network device sends a new measurement window configuration to the terminal device.

The new measurement window configuration may be determined based on a timing of the second cell. For example, an offset of a window indicated by the new measurement window configuration is determined based on the timing of the second cell.

For example, the new measurement window configuration may be related to the timing of the second cell. For example, the new measurement window configuration is related to the timing offset between the second cell and the first cell.

It should be understood that, when the serving cell of the terminal device changes to the second cell, the new measurement window configuration related to the timing of the second cell is used to update the current measurement window configuration, so that an updated measurement window configuration may be more suitable for measurement of the second cell.

Optionally, the network device sends, to the terminal device, a measurement object configuration in which the new measurement window configuration is located.

For example, the measurement window configuration is an SMTC, and the network device sends, to the terminal device, a measurement object (MO) configuration in which the SMTC is located.

Optionally, the network device may further send, to the terminal device, configuration information of the offset of the window indicated by the new measurement window configuration.

That the measurement window configuration is an SMTC is used as an example. For example, in a current protocol, a periodicityAndOffset field defines a periodicity and an offset of an SMTC window, and a duration field defines a length of the SMTC window. The network device may send, to the terminal device, a periodicityAndOffset field that is updated based on the timing of the second cell.

It should be understood that when delivering the periodicityAndOffset field to the terminal device, the network device also needs to notify the terminal device of a correspondence between the updated periodicityAndOffset field and the original periodicityAndOffset field of the terminal device. For example, the correspondence may be notified by using identification information or indication information.

Optionally, the network device may send an RRC reconfiguration message to the terminal device, where the RRC reconfiguration message carries the new measurement window configuration.

It should be understood that the network device may further send the new measurement window configuration to the terminal device by using other downlink signaling. This is not limited in this embodiment of this application.

In a cell handover scenario, the network device to which the first cell belongs or the network device to which the second cell belongs sends the new measurement window configuration to the terminal device.

Optionally, the network device to which the first cell belongs and the network device to which the second cell belongs may be different or may be the same.

That the measurement window configuration is an SMTC is used as an example. It is assumed that the terminal device is handed over from a source cell A to a target cell B. In a handover execution phase, a network device to which the source cell A belongs sends an RRC reconfiguration message to the terminal device, where the RRC reconfiguration message carries not only a handover command but also a measurement configuration, the measurement configuration includes a measurement object configuration (MO configuration), and the MO configuration includes a new SMTC determined based on a timing of the target cell B. Alternatively, in a handover complete phase, a network device to which the target cell B belongs sends an RRC reconfiguration message to the terminal device, where the RRC reconfiguration message carries a measurement configuration, the measurement configuration includes a measurement object configuration (MO configuration), and the MO configuration includes a new SMTC determined based on a timing of the target cell B.

In an RRC connection re-establishment scenario, the network device to which the second cell belongs may send the new measurement window configuration to the terminal device.

Optionally, the network device to which the first cell belongs and the network device to which the second cell belongs may be different or may be the same.

That the measurement window configuration is an SMTC is still used as an example. It is assumed that a serving cell of a terminal device is handed over from a source cell A to a target cell B, and the UE performs RRC connection re-establishment with a network device to which the target cell B belongs. The network device to which the target cell B belongs sends an RRC reconfiguration message to the terminal device, where the RRC reconfiguration message carries a measurement configuration, the measurement configuration includes a measurement object configuration, and the measurement object configuration includes a new SMTC.

620: The terminal device updates the current measurement window configuration based on the new measurement window configuration.

Optionally, the terminal device may replace the current measurement window configuration based on the new measurement window configuration.

In an implementation, the terminal device replaces a measurement object configuration in which the measurement window configuration currently stored by the terminal device is located with the measurement object configuration including the new measurement window configuration.

That the measurement window configuration is an SMTC is used as an example. For example, the network device delivers a measurement configuration to the terminal device, where the measurement configuration includes one or more measurement object (MO) configurations, the MO configuration includes an SMTC, and an offset of a window indicated by the SMTC is updated based on the timing of the second cell. The terminal device directly replaces a current MO configuration including an SMTC with the MO configuration that is delivered by the network device and that includes the SMTC.

In another implementation, the terminal device updates an offset of a window indicated by the currently stored measurement window configuration based on the new measurement window configuration delivered by the network device.

That the measurement window configuration is an SMTC is still used as an example. For example, the network device delivers a measurement configuration to the terminal device, where the measurement configuration includes one or more measurement object (MO) configurations, the MO configuration includes an SMTC, and an offset of a window indicated by the SMTC is updated based on the timing of the second cell. The terminal device updates an offset of SMTC window in a current measurement window configuration based on the SMTC in the MO configuration delivered by the network device.

For example, in a current protocol, a periodicityAndOffset field defines a periodicity and an offset of an SMTC window, and a duration field defines a length of the SMTC window. In this example, the SMTC of the terminal device is updated, by updating a periodicityAndOffset field, based on the SMTC in the MO configuration delivered by the network device.

In the first update manner, there may be a correspondence between the MO configuration delivered by the network device and the MO configuration stored by the terminal device. For ease of description and understanding, the MO configuration delivered by the network device is denoted as a new MO configuration, the SMTC included in the new MO configuration is denoted as a new SMTC, the MO configuration currently stored by the terminal device is denoted as an original MO configuration, and the SMTC included in the original MO configuration is denoted as an original SMTC. That is, each new MO configuration corresponds to an original MO configuration. There are a plurality of manners in which the UE maps a new MO configuration to an original MO configuration.

In a first manner, a new MO configuration delivered by the network device carries indication information, and the indication information can enable the terminal device to identify an original MO configuration corresponding to the new MO configuration. The indication information may include SSB frequency information, CSI-RS frequency information, or the like.

In a second manner, a measurement configuration delivered by the network device carries a measurement object identifier (MO ID), and a new MO configuration is mapped to an original MO configuration by carrying the MO ID in the measurement configuration. It should be understood that the original MO configuration stored by the terminal device also has a corresponding MO ID. It is assumed that SMTCs in an MO1 configuration and an MO2 configuration need to be updated, an MO ID of the MO1 configuration is an MO ID 1, and an MO ID of the MO2 configuration is an MO ID 2. The network device sends a measurement configuration to the terminal device, where the measurement configuration includes two new MO configurations and MO IDs of the two new MO configurations: an MO ID 1 and an MO ID 2. After receiving the measurement configuration delivered by the network device, the terminal device may map the new MO configurations to the original MO configurations by using the MO IDs carried in the measurement configuration, and then may update the original MO1 configuration based on a new MO1 configuration delivered by the network device and update the original MO2 configuration based on a new MO2 configuration.

In a third manner, the terminal device automatically maps a new MO configuration to an original MO configuration based on information (for example, information such as a frequency and a subcarrier spacing) carried in the MO configuration.

It should be understood that the terminal device may alternatively map a new MO configuration to an original MO configuration in another feasible manner. This is not limited in this application.

In this embodiment, in the scenario in which the serving cell of the terminal device changes from the first cell to the second cell, the network device sends, to the terminal device, the new measurement window configuration determined based on the timing of the second cell, so that the terminal device updates the currently stored measurement window configuration based on the new measurement window configuration. Therefore, according to the solution provided in this application, when the serving cell of the terminal device changes, it can be ensured, to some extent, that the measurement window configuration of the terminal device is applicable to the current measurement task.

Figure 7:
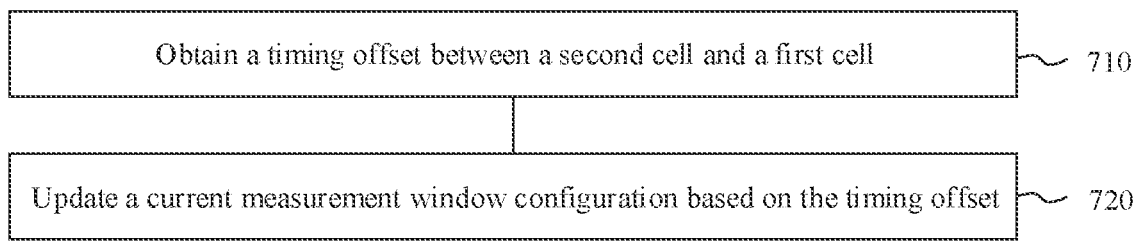
FIG. 7 is still another schematic flowchart of a measurement configuration method according to an embodiment of this application.

Optionally, in a second update manner, as shown in FIG. 7, the current measurement window configuration is updated through steps 710 and 720.

710: The terminal device obtains a timing offset between the second cell and the first cell.

The terminal device may obtain the timing offset between the second cell and the first cell through measurement.

720: The terminal device updates the current measurement window configuration based on the timing offset.

For example, an offset of a window indicated by the currently stored measurement window configuration is updated based on the timing offset between the second cell and the first cell, to update the entire measurement window configuration.

That the measurement window configuration is an SMTC is used as an example. It is assumed that in a source cell A, four MO configurations: an MO1, an MO2, an MO3, and an MO4 are configured for the terminal device, where the MO1 and the MO3 include SMTCs.

In a cell handover scenario, it is assumed that the serving cell of the terminal device is handed over from the source cell A to a target cell B. In a handover preparation process, or in a handover process, or after handover is completed, the terminal device separately calculates, based on a timing offset, obtained by the terminal device through measurement, between the target cell B and the source cell A, offsets that are of windows indicated by the SMTCs in the MO1 and the MO3 and that use a timing of the target cell B as a reference. The SMTCs in the MO1 and the MO3 are updated based on the calculated offsets of the windows indicated by the SMTCs, and the MO1 and the MO3 continue to be used. Optionally, the terminal device may send updated SMTCs that are in the MO1 and the MO3 to the target cell B, or may send the MO1 and the MO3 to the target cell B; or the UE may send an indication to the target cell B, to indicate that the UE has completed the update of the SMTCs.

For example, the terminal device calculates the offset of the window indicated by the SMTC based on the timing offset between the target cell B and the source cell A in the following manner: It is assumed that when the serving cell of the terminal device is the source cell A, an original offset of the window indicated by the SMTC is L (for example, a unit is ms), and it is assumed that the timing offset between the target cell B and the source cell A is ΔT. In this case, the offset, calculated based on the timing offset ΔT between the target cell B and the source cell A, of the window indicated by the SMTC is L+ΔT.

In an RRC connection re-establishment scenario, the serving cell of the terminal device changes from a source cell A to a target cell B. In a re-establishment preparation process, or in a re-establishment process, or after re-establishment is completed, the terminal device separately calculates, based on a timing offset, obtained by the terminal device through measurement, between the target cell B and the source cell A, offsets that are of windows indicated by the SMTCs in the MO1 and the MO3 and that use a timing of the target cell B as a reference. The SMTCs in the MO1 and the MO3 are updated based on the calculated offsets of the windows, and the MO1 and the MO3 continue to be used. Optionally, the terminal device may send updated SMTCs that are in the MO1 and the MO3 to the target cell B, or may send the MO1 and the MO3 to the target cell B; or the UE may send an indication to the target cell B, to indicate that the UE has completed the update of the SMTCs.

For example, a periodicityAndOffset field defines a periodicity and an offset of a window indicated by an SMTC. Therefore, the terminal device may update an offset of a window in a periodicityAndOffset field based on the timing offset between the second cell and the first cell, to update a current SMTC.

In this embodiment, in the scenario in which the serving cell of the terminal device changes from the first cell to the second cell, the currently stored measurement window configuration is updated by the terminal device based on the timing offset between the second cell and the first cell. Therefore, according to the solution provided in this application, when the serving cell of the terminal device changes, it can be ensured, to some extent, that the measurement window configuration of the terminal device is applicable to the current measurement task.

Optionally, in a third update manner, in step 520, the updating a current measurement window configuration includes: updating the current measurement window configuration by using a default measurement window configuration.

The default measurement window configuration may be preconfigured by the network side or specified in the protocol.

For example, preconfiguration by the network side means that before the serving cell of the terminal device changes, the network device preconfigures a measurement window configuration for the terminal device.

For example, the default measurement window configuration is used by the terminal device when there is no available measurement window configuration.

The foregoing describes, with reference to FIG. 6 and FIG. 7, the solution in which the terminal device updates the current measurement window configuration when the serving cell of the terminal device changes. The following describes a solution in which the terminal device deletes the current measurement window configuration when the serving cell of the terminal device changes.

Optionally, in step 520, the current measurement window configuration is deleted.

The current measurement window configuration may be deleted in a plurality of manners.

Optionally, in a first deletion manner, only the current measurement window configuration is deleted.

That the measurement window configuration is an SMTC is used as an example. In a cell handover scenario, it is assumed that the serving cell of the terminal device is handed over from a source cell A to a target cell B. In a handover process or after handover is completed, the terminal device deletes all SMTCs configured in the source cell A. It is assumed that in the source cell A, measurement objects: an MO1, an MO2, an MO3, and an MO4 are configured for the terminal device, where SMTCs are configured in the MO1 and the MO3. In this case, the terminal device deletes the SMTCs in the MO1 and the MO3, and stops all measurement tasks related to the MO1 and the MO3. Optionally, the terminal device may delete all measurement IDs associated with the MO1 and the MO3.

That the measurement window configuration is an SMTC is still used as an example. In an RRC connection re-establishment scenario, the serving cell of the terminal device changes from a source cell A to a target cell B. In an RRC connection re-establishment process or after RRC connection re-establishment is completed, the terminal device deletes all SMTCs configured in the source cell A. It is assumed that in the source cell A, an MO1, an MO2, an MO3, and an MO4 are configured for the terminal device, where SMTCs are configured in the MO1 and the MO3. In this case, the terminal device deletes the SMTCs in the MO1 and the MO3, and stops all measurement tasks related to the MO1 and the MO3. Optionally, the UE may delete all measurement IDs (measurement ID) associated with the MO1 and the MO3.

When the serving cell of the terminal device changes, the terminal device may autonomously delete the current measurement window configuration, or may delete the current measurement window configuration according to an indication of the network device.

Optionally, the deleting a current measurement window configuration includes: receiving indication information, where the indication information is used to indicate to delete the current measurement window configuration; and deleting only the current measurement window configuration based on the indication information.

It should be understood that, when the indication information is used to indicate to reserve the current measurement window configuration, the terminal device reserves the current measurement window configuration.

The indication information may be explicit indication information or implicit indication information. For example, when the network device does not deliver a new measurement window configuration, it indicates that the current measurement window configuration is to be deleted.

The network device may deliver, to the terminal device by using an RRC reconfiguration message, the indication information used to indicate to delete or reserve the current measurement window configuration of the terminal device.

That the measurement window configuration is an SMTC is still used as an example. It is assumed that in a source cell A, four MOs: an MO, an MO2, an MO3, and an MO4 are configured for the terminal device, where the MO1 and the MO3 include SMTCs.

In a cell handover scenario, the terminal device is handed over from the source cell A to a target cell B. In a handover execution process, in the source cell A, an RRC reconfiguration message is sent to the terminal device, where the RRC reconfiguration message carries not only a handover command but also indication information. The indication information is used to indicate the terminal device to release or reserve current SMTCs, that is, the SMTCs in the MO1 and the MO3. After receiving the indication information, if the indication information is used to indicate the terminal device to release the SMTCs, the terminal device deletes the SMTCs in the MO1 and the MO3; otherwise, the terminal device does not delete the SMTCs in the MO1 and the MO3.

In an RRC connection re-establishment scenario, the serving cell of the terminal device changes from a source cell A to a target cell B. In the target cell B, an RRC reconfiguration message is sent to the terminal device, where the RRC reconfiguration message carries not only a handover command but also indication information. The indication information is used to indicate the terminal device to release or reserve current SMTCs, that is, the SMTCs in the MO1 and the MO3. After receiving the indication information, if the indication information is used to indicate the terminal device to release the SMTCs, the terminal device deletes the SMTCs in the MO1 and the MO3; otherwise, the terminal device does not delete the SMTCs in the MO1 and the MO3.

Optionally, in a second deletion manner, a measurement object configuration in which the current measurement window configuration is located is deleted.

That the measurement window configuration is an SMTC is still used as an example. In a cell handover scenario, the terminal device is handed over from a source cell A to a target cell B. In a handover process or after handover is completed, the terminal device deletes all MO configurations that are configured in the source cell A and that include SMTCs. It is assumed that in the source cell A, an MO1, an MO2, an MO3, and an MO4 are configured for the terminal device, where SMTCs are configured in the MO1 and the MO3. In this case, the terminal device deletes the MO1 and the MO3, and stops all measurement tasks related to the MO1 and the MO3. The terminal device may delete all measurement IDs associated with the MO1 and the MO3.

That the measurement window configuration is an SMTC is still used as an example. In an RRC connection re-establishment scenario, the serving cell of the terminal device changes from a source cell A to a target cell B. In an RRC connection re-establishment process or after RRC connection re-establishment is completed, the terminal device deletes all MO configurations that are configured in the source cell A and that include SMTCs. It is assumed that in the source cell A, an MO1, an MO2, an MO3, and an MO4 are configured for the UE, where SMTCs are configured in the MO1 and the MO3. In this case, the UE deletes the MO1 and the MO3, and stops all measurement tasks related to the MO1 and the MO3. Optionally, the terminal device may delete all measurement IDs associated with the MO1 and the MO3.

When the serving cell of the terminal device changes, the terminal device may autonomously delete the measurement object configuration (MO configuration) in which the current measurement window configuration is located, or may delete, according to an indication of the network device, the MO configuration in which the current measurement window configuration is located.

Optionally, the deleting a measurement object configuration in which the current measurement window configuration is located includes: receiving indication information, where the indication information is used to indicate to delete the measurement object configuration in which the current measurement window configuration is located; and deleting, based on the indication information, the measurement object configuration in which the current measurement window configuration is located.

It should be understood that, when the indication information is used to indicate to reserve the measurement object configuration in which the current measurement window configuration is located, the terminal device reserves the current measurement window configuration and the measurement object configuration in which the current measurement window configuration is located.

The indication information may be explicit indication information or implicit indication information. For example, when the network device does not deliver a new measurement window configuration, it indicates that the measurement object configuration in which the current measurement window configuration is located is to be deleted.

The network device may deliver, to the terminal device by using an RRC reconfiguration message, the indication information used to indicate to delete or reserve the measurement object configuration in which the current measurement window configuration of the terminal device is located.

That the measurement window configuration is an SMTC is still used as an example. It is assumed that in a source cell A, four MOs: an MO1, an MO2, an MO3, and an MO4 are configured for the terminal device, where the MO1 and the MO3 include SMTCs.

In a cell handover scenario, the terminal device is handed over from the source cell A to a target cell B. In a handover execution process, in the source cell A, an RRC reconfiguration message is sent to the terminal device, where the RRC reconfiguration message carries not only a handover command but also indication information. The indication information is used to indicate the terminal device to release or reserve a current MO configuration including an SMTC. After receiving the indication information, if the indication information is used to indicate the terminal device to release the MO configurations, the terminal device deletes the MO1 and the MO3; otherwise, the terminal device does not delete the MO1 and the MO3.

In an RRC connection re-establishment scenario, the serving cell of the terminal device changes from a source cell A to a target cell B. In the target cell B, an RRC reconfiguration (RRC Reconfiguration) message is sent to the terminal device, where the RRC reconfiguration message carries not only a handover command but also indication information. The indication information is used to indicate the terminal device to release or reserve a current MO configuration including an SMTC. After receiving the indication information, if the indication information is used to indicate the terminal device to release the MO configurations, the terminal device deletes the MO1 and the MO3; otherwise, the terminal device does not delete the MO1 and the MO3.

In the embodiments in which the current measurement window configuration is deleted, if only the current measurement window configuration (for example, the SMTC) is deleted, but the corresponding measurement object configuration (MO configuration) is not deleted, after deleting the current measurement window configuration, the terminal device may choose to suspend measurement of a part of cells, or may choose to continue the measurement.

For example, the network device preconfigures a default measurement window configuration for the terminal device. When the terminal device has no available measurement window configuration, the terminal device may continue to perform the measurement by using the default measurement window configuration.

The foregoing describes the solution in which the current measurement window configuration is updated or deleted. In addition, the current measurement window configuration may be first deleted, and then a new measurement window configuration is used.

Optionally, in step 520, after the current measurement window configuration is deleted, a new measurement window configuration is used; or after the measurement object configuration in which the current measurement window configuration is located is deleted, a measurement object configuration including a new measurement window configuration is used.

In this embodiment, the new measurement window configuration may be obtained from the network side, or may be a default measurement window configuration.

The measurement object configuration including the new measurement window configuration may be obtained from the network side.

In the embodiment shown in FIG. 6, if the new measurement window configuration delivered by the network side in step 610 corresponds only to a part of configuration information in the current measurement window configuration of the terminal device, the part of configuration information in the current measurement window configuration may be updated based on the new measurement window configuration.

To resolve the foregoing problem, this application provides the following solution.

Optionally, in step 520, the updating or deleting a current measurement window configuration includes: receiving a new measurement window configuration, where the new measurement window configuration corresponds to a part of configuration information in the current measurement window configuration; updating the part of configuration information in the current measurement window configuration based on the new measurement window configuration; and deleting or updating other configuration information in the current measurement window configuration.

For example, the part of configuration information in the current measurement window configuration may be updated based on the new measurement window configuration in any one of the foregoing described update manners.

As shown in FIG. 6, in step 61o, the network device sends, to the terminal device, a new measurement window configuration determined based on the timing of the second cell, where the new measurement window configuration corresponds to a part of configuration information in the current measurement window configuration. In step 620, the terminal device updates the part of configuration information in the current measurement window configuration based on the new measurement window configuration. The method shown in FIG. 6 further includes step 630. In step 630, the terminal device deletes or updates other configuration information in the current measurement window configuration.

In step 630, if the other configuration information in the current measurement window configuration is deleted, it indicates that measurement is performed only based on the new measurement window configuration delivered by the network device, and measurement corresponding to the other configuration information in the current measurement window configuration is stopped.

Optionally, in step 630, the updating other configuration information in the current measurement window configuration includes: obtaining a timing offset between the first cell and the second cell; and updating the other configuration information in the current measurement window configuration based on the timing offset.

Optionally, in step 630, the updating other configuration information in the current measurement window configuration includes: replacing the other configuration information in the current measurement window configuration with a default measurement window configuration.

The default measurement window configuration may be a measurement window configuration preconfigured by the network side for the terminal device, or may be a measurement window configuration specified in a protocol.

That the measurement window configuration is an SMTC is used as an example. In a cell handover scenario, it is assumed that the terminal device is handed over from a source cell A to a target cell B. It is assumed that in the source cell A, an MO3 configuration including an SMTC is configured for the terminal device, but during handover, an RRC reconfiguration message sent by a network device to which the source cell A belongs does not carry the SMTC corresponding to the MO3. In this case, the terminal device releases the MO3, that is, deletes the MO3; or the terminal device calculates, based on a timing offset, obtained by the terminal device through measurement, between the target cell B and the source cell A, an offset that is of a window indicated by the SMTC and that use a timing of the target cell B as a reference, updates an offset of the window indicated by the SMTC in the MO3 configuration, and continues to use the MO3 configuration.

It can be learned from the foregoing descriptions that according to the embodiments of this application, when the serving cell of the terminal device changes, the current measurement window configuration of the terminal device is updated or deleted, so that a problem that the measurement window configuration of the terminal device is not applicable to measurement can be resolved to some extent.

It should be understood that when the serving cell of the terminal device changes from the first cell to the second cell, if the first cell is synchronized with the second cell, the current measurement window configuration of the terminal device does not need to be updated or deleted.

An embodiment of this application further provides a method for exchanging an inter-node message between network devices. The inter-node message may include, for example, measurement timing configuration information.

For example, in a scenario in which a source network device sends measurement timing configuration information to a target network device, the measurement timing configuration information is determined based on a timing of the source network device. In other words, the source network device determines the measurement timing configuration information with reference to the timing of the source network device. The timing of the source network device mentioned herein is a timing of a cell belonging to the source network device.

It should be understood that if the measurement timing configuration information exchanged between the source network device and the target network device is determined by using a timing of the target network device as a reference, it is not easy to determine a cell that belongs to the target network device and whose timing is used as a reference. Therefore, efficiency of determining the measurement timing configuration information exchanged between the network devices can be improved by using the timing of the source network device as a reference.

Optionally, the measurement timing configuration information exchanged between the network devices may further carry SSB information, and the SSB information may be specifically expressed by using a bitmap. For example, the SSB information may be SSB index information or SSB time domain position information.

For example, the SSB information may be represented as ssb-ToMeasure. ssb-ToMeasure represents a set of SS blocks to be measured in a window indicated by an SMTC, and ssb-ToMeasure is represented in a bitmap form. ssb-ToMeasure may be set to be optional. When ssb-ToMeasure is not carried, it indicates that all SS blocks in the SMTC window need to be measured.

For example, ssb-ToMeasure may be a bitmap of a length of L, and each bit corresponds to each SS block. For a frequency band below 3 GHz, L may be 4. For a frequency band above 3 GHz and below 6 GHz, L may be 8. For a frequency band above 6 GHz, L may be 64. The terminal device may measure an SS block, in the SMTC window, corresponding to a bit whose value is 1 in the bitmap.

For another example, the SSB information may be represented as ssb-PositionsInBurst. ssb-PositionsInBurst indicates a time domain position at which an SS block is sent in an SS burst, and is represented in a bitmap form. The first/leftmost bit corresponds to a reference signal/physical broadcast channel block (SS/PBCH block) index 0, the second bit corresponds to an SS/PBCH block index 1, and so on. In the bitmap, an SS/PBCH block corresponding to a bit whose value is 0 is not sent, and an SS/PBCH block corresponding to a bit whose value is 1 is already sent and/or is to be (continues) to be sent.

The solution, provided in this embodiment, in which the network devices exchange an inter-node message may have no coupling relationship with the foregoing embodiments. Alternatively, the solution, provided in this embodiment, in which the network devices exchange an inter-node message may be combined with the foregoing embodiments based on internal logic. This is not limited in this application.

An embodiment of this application further provides a communications apparatus. The communications apparatus is configured to perform the method on a source network device side in the foregoing method embodiment. The communications apparatus includes a processing unit and a transceiver unit. The processing unit is configured to generate measurement timing configuration information. For example, the measurement timing configuration information may be determined based on a timing of the communications apparatus. The transceiver unit is configured to send the measurement timing configuration information to a target network device.

An embodiment of this application further provides a communications apparatus. The communications apparatus is configured to perform the method on a target network device side in the foregoing method embodiment. The communications apparatus includes a processing unit and a transceiver unit. The transceiver unit is configured to receive measurement timing configuration information from a source network device, where the measurement timing configuration information includes SSB information indicating an SSB to be measured in a measurement window indicated by an SMTC. The processing unit is configured to perform processing based on the SSB information.

An embodiment of this application further provides a system. The system includes a first network device and a second network device. The first network device corresponds to the source network device in the foregoing method embodiment, and the second network device corresponds to the target network device in the foregoing method embodiment. The first network device is configured to determine measurement timing configuration information, where the measurement timing configuration information includes SSB information indicating an SSB to be measured in a measurement window indicated by an SMTC; and is further configured to send the measurement timing configuration information to the second network device. The second network device is configured to perform processing based on the SSB information.

Optionally, the measurement timing configuration information is determined based on a timing of the first network device.

Optionally, the SSB information carried in the measurement timing configuration information may be represented by using a bitmap.

In an LTE system, during cell handover, swapping of measurement objects (MO) is performed, which specifically means that a measID is originally associated with an MO corresponding to a source (or target) primary frequency, and is now associated with an MO corresponding to a target (or source) primary frequency (primary frequency).

Currently, an MO swapping mechanism is not introduced into NR.

To resolve the foregoing problem, an embodiment of this application provides a solution in which during cell handover, a terminal device associates a measurement identifier (measID) originally associated with a measurement object (MO) corresponding to a source primary cell (source SpCell) with an MO corresponding to a target primary cell (target SpCell), and associates a measID originally associated with an MO corresponding to a target SpCell with an MO corresponding to a source SpCell.

The solution, provided in this embodiment, in which the terminal device swaps an MO during cell handover may have no coupling relationship with the foregoing embodiments. Alternatively, the solution, provided in this embodiment, in which the terminal device swaps an MO during cell handover may be combined with the foregoing embodiments based on internal logic. This is not limited in this application.

An embodiment of this application further provides a communications apparatus. The communications apparatus corresponds to the terminal device used to implement swapping of measurement objects (swapping MO) in the foregoing method embodiment. The communications apparatus includes a processing unit, and the processing unit is configured to: associate a measurement identifier (measID) originally associated with a measurement object (MO) corresponding to a source primary cell (source SpCell) with an MO corresponding to a target primary cell (target SpCell), and associate a measID originally associated with an MO corresponding to a target SpCell with an MO corresponding to a source SpCell. The communications apparatus also includes a transceiver unit (or referred to as a communications interface).

The embodiments described in this specification may be independent solutions, or may be combined based on internal logic. All these solutions fall within the protection scope of this application.

It may be understood that in the foregoing method embodiments, a method and an operation implemented by the terminal device may alternatively be implemented by a component (for example, a chip or a circuit) that may be used in the terminal device, and a method and an operation implemented by the network device may alternatively be implemented by a component (for example, a chip or a circuit) that may be used in the network device.

The foregoing describes the method embodiments provided in the embodiments of this application. The following describes apparatus embodiments provided in the embodiments of this application. It should be understood that descriptions of the apparatus embodiments correspond to the descriptions of the method embodiments. Therefore, for content that is not described in detail, refer to the foregoing method embodiments. For brevity, details are not described herein again.

The foregoing mainly describes the solutions provided in the embodiments of this application from a perspective of interaction between the network elements. It may be understood that each network element is, for example, a transmit end device or a receive end device. To implement the foregoing functions, the transmit end device and the receive end device each include a corresponding hardware structure and/or software module for performing each function. A person skilled in the art should easily be aware that, in combination with units and algorithm steps of the examples described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, function modules of the transmit end device or the receive end device may be divided based on the foregoing method examples. For example, function modules may be obtained through division based on corresponding functions, or two or more functions may be integrated into one processing module. The integrated module may be implemented in a form of hardware, or may be implemented in a form of a software function module. It should be noted that, in the embodiments of this application, module division is an example, and is merely logical function division. During actual implementation, another division manner may be used. An example in which each function module is obtained through division based on each corresponding function is used below for description.

An embodiment of this application further provides a first communications apparatus. The first communications apparatus may be a terminal device, or may be a chip. The first communications apparatus may be configured to perform an action performed by the terminal device in the foregoing method embodiments.

Figure 8:
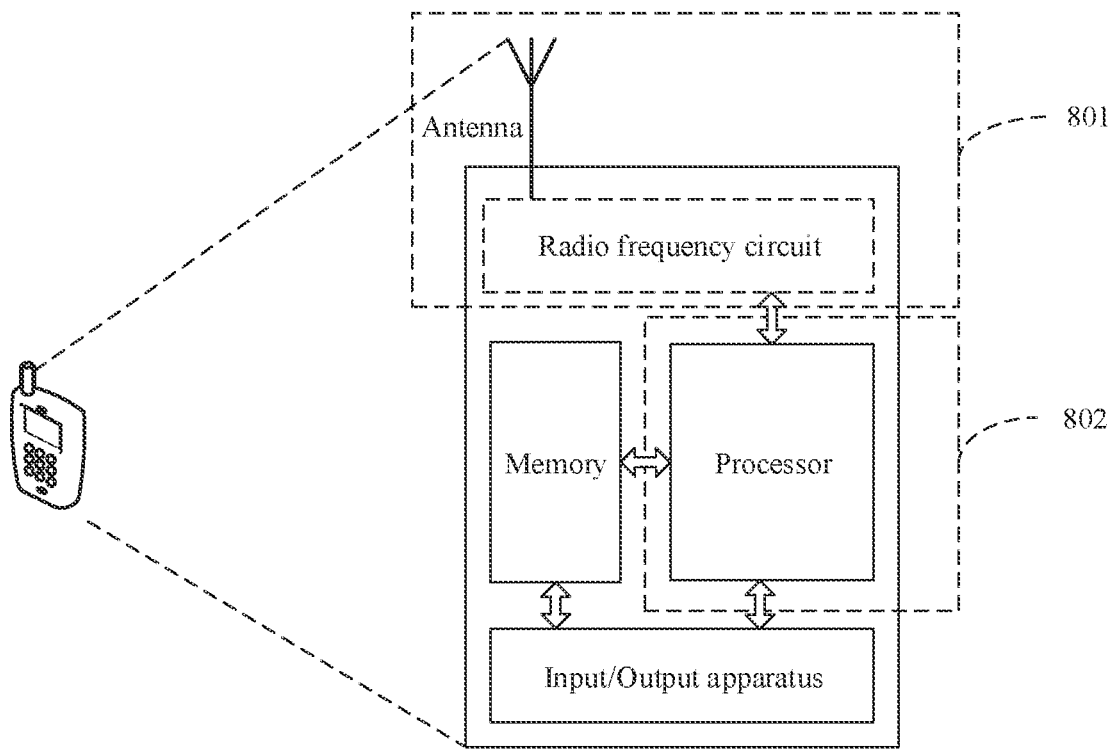
FIG. 8 is a schematic block diagram of a communications apparatus according to an embodiment of this application.

When the first communications apparatus is the terminal device, FIG. 8 is a simplified schematic structural diagram of the terminal device. For ease of understanding and convenience of figure illustration, an example in which the terminal device is a mobile phone is used in FIG. 8. As shown in FIG. 8, the terminal device includes a processor, a memory, a radio frequency circuit, an antenna, and an input/output apparatus. The processor is mainly configured to: process a communication protocol and communication data, control the terminal device, execute a software program, process data of the software program, and so on. The memory is mainly configured to store a software program and data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display screen, or a keyboard, is mainly configured to receive data input by a user and output data to the user. It should be noted that some types of terminal devices may have no input/output apparatus.

When data needs to be sent, after performing baseband processing on the to-be-sent data, the processor outputs a baseband signal to the radio frequency circuit. After performing radio frequency processing on the baseband signal, the radio frequency circuit sends a radio frequency signal to the outside through the antenna in a form of an electromagnetic wave. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 8 shows only one memory and one processor. In an actual terminal device product, there may be one or more processors and one or more memories. The memory may also be referred to as a storage medium, a storage device, or the like.

The memory may be disposed independent of the processor, or may be integrated with the processor. This is not limited in this embodiment of this application.

In this embodiment of this application, the antenna and the radio frequency circuit that have sending and receiving functions may be considered as a transceiver unit of the terminal device, and the processor that has a processing function may be considered as a processing unit of the terminal device.

As shown in FIG. 8, the terminal device includes a transceiver unit 801 and a processing unit 802. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 801 and that is configured to implement a receiving function may be considered as a receiving unit, and a component that is in the transceiver unit 801 and that is configured to implement a sending function may be considered as a sending unit. In other words, the transceiver unit 801 includes the receiving unit and the sending unit. The transceiver unit may also be sometimes referred to as a transceiver, a transceiver machine, a transceiver circuit, or the like. The receiving unit may also be sometimes referred to as a receiver, a receiver machine, a receiver circuit, or the like. The sending unit may also be sometimes referred to as a transmitter, a transmitter machine, a transmitter circuit, or the like.

For example, in an implementation, the processing unit 802 is configured to perform step 510 and step 520 in FIG. 5, and/or the processing unit 802 is further configured to perform another processing step on the terminal device side in the embodiments of this application. The transceiver unit 801 is further configured to perform other sending and receiving steps on the terminal device side in the embodiments of this application.

For another example, in another implementation, the transceiver unit 801 is configured to perform a receiving operation on the terminal device side in step 610 in FIG. 6, and/or the transceiver unit 801 is further configured to perform other receiving and sending steps on the terminal device side in the embodiments of this application. The processing unit 802 is configured to perform step 620 and step 630 in FIG. 6, and/or the processing unit 802 is further configured to perform another processing step on the terminal device side in the embodiments of this application.

For another example, in another implementation, the processing unit 802 is configured to perform step 710 and step 720 in FIG. 7, and/or the processing unit 802 is further configured to perform another processing step on the terminal device side in the embodiments of this application. The transceiver unit 802 is configured to perform other sending and receiving steps on the terminal device side in the embodiments of this application.

It may be understood that the terminal device including the transceiver unit and the processing unit may not depend on the structure shown in FIG. 8.

When the first communications apparatus is the chip, the chip includes a transceiver unit and a processing unit. The transceiver unit may be an input/output circuit or a communications interface. The processing unit is a processor, a microprocessor, or an integrated circuit integrated on the chip.

It should be understood that FIG. 8 is merely an example instead of a limitation.

An embodiment of this application further provides a communications apparatus including a processing unit. The communications apparatus may be a terminal device, or may be a component (for example, a chip or a circuit) that may be used in a terminal device. The processing unit is configured to perform the method on the terminal device side in the method embodiments. For example, the processing unit may also correspond to the processing unit 802 shown in FIG. 8.

Optionally, the communications apparatus may further include a transceiver unit. The transceiver unit is configured to perform receiving and/or sending steps on the terminal device side in the method embodiments. For example, the transceiver unit may correspond to the transceiver unit 801 shown in FIG. 8.

An embodiment of this application further provides a communications apparatus. The communications apparatus may be a terminal device, or may be a component (for example, a chip or a circuit) that may be used in a terminal device. The communications apparatus includes a determining module and a processing module. The determining module is configured to determine that a serving cell changes from a first cell to a second cell. The processing module is configured to update or delete a current measurement window configuration, where the measurement window configuration is used to indicate a time domain position at which the terminal device performs measurement.

Optionally, both the determining module and the processing module may be implemented by a processor or a processor-related circuit. For example, the determining module and the processing module may be implemented by the processing unit 802 in the foregoing embodiment.

Optionally, the communications apparatus may further include a sending module, configured to perform a sending step on the terminal device side in the foregoing method embodiments.

The sending module may be implemented by a transmitter or a transmitter-related circuit. The sending module may alternatively be implemented by a transceiver circuit.

Optionally, the communications apparatus may further include a receiving module, configured to perform a receiving step on the terminal device side in the foregoing method embodiments.

The receiving module may be implemented by a receiver or a receiver-related circuit. The receiving module may alternatively be implemented by a transceiver circuit.

Optionally, the sending module and the receiving module may be integrated into a transceiver module. This is not limited in this embodiment of this application.

It may be understood that, for operations or implementations of the modules in the communications apparatus, further refer to related descriptions in the method embodiments, and details are not described herein again.

An embodiment of this application further provides a second communications apparatus. The second communications apparatus may be a network device, or may be a chip. The second communications apparatus may be configured to perform an action performed by the network device in the foregoing method embodiments.

Figure 9:
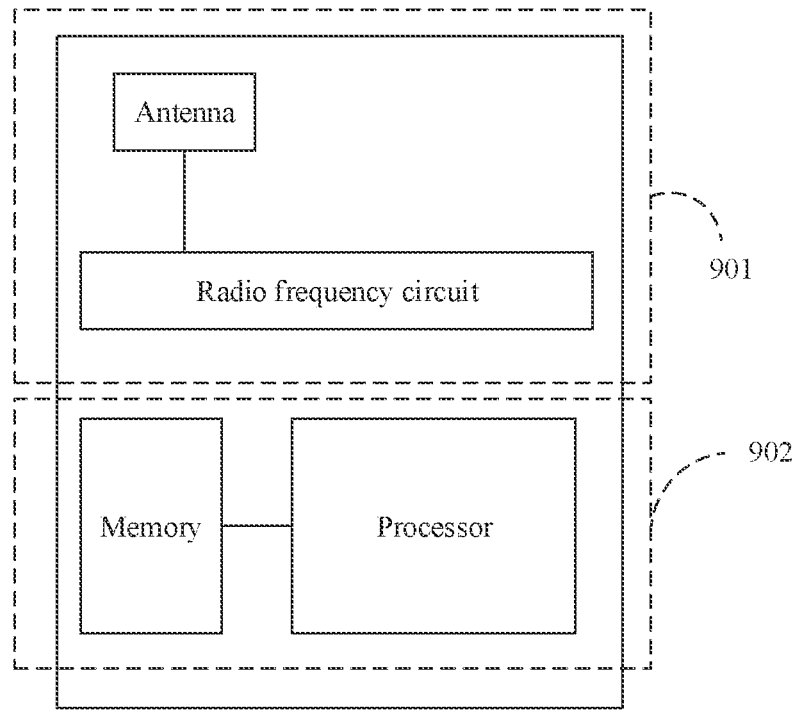
FIG. 9 is a schematic block diagram of another communications apparatus according to an embodiment of this application.

When the second communications apparatus is the network device, for example, a base station, FIG. 9 is a simplified schematic structural diagram of the base station. The base station includes a part 901 and a part 902. The part 901 is mainly configured to: send and receive a radio frequency signal, and perform conversion between the radio frequency signal and a baseband signal. The part 902 is mainly configured to: perform baseband processing, control the base station, and so on. The part 901 may usually be referred to as a transceiver unit, a transceiver machine, a transceiver circuit, a transceiver, or the like. The part 902 is usually a control center of the base station, may be usually referred to as a processing unit, and is configured to control the base station to perform an action of generating the first message by the network device in the foregoing method embodiments. For details, refer to descriptions in the foregoing related parts.

The transceiver unit of the part 901 may also be referred to as a transceiver, a transceiver machine, or the like. The transceiver unit includes an antenna and a radio frequency unit, where the radio frequency unit is mainly configured to perform radio frequency processing. Optionally, a component that is in the part 901 and that is configured to implement a receiving function may be considered as a receiving unit, and a component that is configured to implement a sending function may be considered as a sending unit. In other words, the part 901 includes the receiving unit and the sending unit. For example, the receiving unit may also be referred to as a receiver, a receiver machine, a receive circuit, or the like, and the sending unit may be referred to as a transmitter, a transmitter machine, a transmit circuit, or the like.

The part 902 may include one or more boards. Each board may include one or more processors and one or more memories. The processor is configured to read and execute a program in the memory, to implement a baseband processing function and control the base station. If there are a plurality of boards, the boards can be interconnected to increase a processing capability. In an optional implementation, a plurality of boards may share one or more processors, or a plurality of boards share one or more memories, or a plurality of boards simultaneously share one or more processors.

It may be understood that the network device including the transceiver unit and the processing unit may not depend on the structure shown in FIG. 9.

When the second communications apparatus is the chip, the chip includes a transceiver unit and a processing unit. The transceiver unit may be an input/output circuit or a communications interface. The processing unit is a processor, a microprocessor, or an integrated circuit integrated on the chip.

It should be understood that FIG. 9 is merely an example instead of a limitation.

An embodiment of this application further provides a communications apparatus. The communications apparatus may be a network device, or may be a component (for example, a chip or a circuit) that may be used in a network device. The communications apparatus includes a determining module and a sending module. The determining module is configured to: when a serving cell of a terminal device changes from a first cell to a second cell, determine a new measurement window configuration of the terminal device based on a timing of the second cell. The sending module is configured to send the new measurement window configuration to the terminal device.

Optionally, the determining module may be implemented by a processor or a processor-related circuit. For example, the determining module may be implemented by the part 902 in the foregoing embodiment. The sending module may be implemented by a transmitter or a transmitter-related circuit. The sending module may alternatively be implemented by a transceiver circuit.

Optionally, the determining module may further implement a processing step on the network device side in the foregoing method embodiments. The sending module may further implement a sending step on the network device side in the foregoing method embodiments.

Optionally, the communications apparatus may further include a receiving module, configured to perform a receiving step on the network device side in the foregoing method embodiments.

It may be understood that, for operations or implementations of the modules in the communications apparatus, further refer to related descriptions in the method embodiments, and details are not described herein again.

Figure 10:
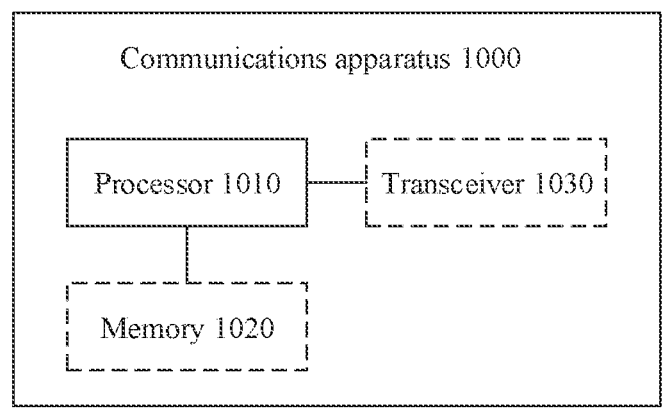
FIG. 10 is another schematic block diagram of a communications apparatus according to an embodiment of this application.

As shown in FIG. 10, an embodiment of this application further provides a communications apparatus 1000. The communications apparatus 1000 may be a terminal device, or may be a component (for example, a chip or a circuit) that may be used in a terminal device. The communications apparatus 1000 includes a processor 1010. The processor 1010 is configured to perform the method on the terminal device side in the foregoing method embodiments.

Optionally, in this embodiment, the communications apparatus 1000 may further include a memory 1020. The memory 1020 is configured to store an instruction, the processor 1010 is configured to execute the instruction stored in the memory 1020, and execution of the instruction stored in the memory 1020 enables the processor 1010 to perform the method on the terminal device side in the foregoing method embodiments.

For example, the memory 1020 may be further configured to store data.

Optionally, in this embodiment, the communications apparatus 1000 may further include a transceiver 1030.

In a possible manner, the processor 1010 may control the transceiver 1030 to receive and/or send a signal.

In another possible implementation, the communications apparatus 1000 may include a processor 1010, a memory 1020, and a transceiver 1030. The processor 1010, the memory 1020, and the transceiver 1030 may communicate with each other through an internal connection path, to transfer a control and/or data signal.

For example, the memory may be further configured to store information received by the transceiver 1030.

For example, the execution of the instruction stored in the memory 1020 enables the processor 1010 to: determine that a serving cell changes from a first cell to a second cell; and update or delete a current measurement window configuration, where the measurement window configuration is used to indicate a time domain position at which the terminal device performs measurement.

Therefore, for a scenario in which the serving cell of the terminal device changes, this embodiment of this application provides a measurement window configuration processing solution, that is, updating or deleting the current measurement window configuration.

It should be understood that, when the serving cell of the terminal device changes, the current measurement window configuration of the terminal device is updated or deleted, to facilitate measurement of the cell by the terminal device. For example, when the serving cell of the terminal device changes, the current measurement window configuration of the terminal device is updated, so that a problem that the current measurement window configuration of the terminal device is not applicable to a current measurement task can be resolved to some extent. For another example, when the serving cell of the terminal device changes, the current measurement window configuration of the terminal device is deleted, so that unnecessary power consumption of the terminal device can be avoided.

Optionally, in some embodiments, the transceiver 1030 is configured to receive a new measurement window configuration. The processor 1010 is configured to update the current measurement window configuration based on the new measurement window configuration.

Optionally, in some embodiments, the processor 1010 is configured to: obtain a timing offset between the second cell and the first cell; and update the current measurement window configuration based on the timing offset.

Optionally, in some embodiments, the processor 1010 is configured to determine, based on a handover command, that the serving cell is handed over from the first cell to the second cell; and the transceiver 1030 is configured to receive the new measurement window configuration from a network device to which the first cell belongs or from a network device to which the second cell belongs.

Optionally, in some embodiments, the processor 1010 is configured to trigger radio resource control RRC connection re-establishment, so that the serving cell changes from the first cell to the second cell; and the transceiver 1030 is configured to receive the new measurement window configuration from a network device to which the second cell belongs.

Optionally, in some embodiments, the new measurement window configuration is included in an RRC reconfiguration message.

Optionally, in some embodiments, the processor 1010 is configured to delete a measurement object configuration in which the current measurement window configuration is located.

Optionally, in some embodiments, the transceiver 1030 is configured to receive indication information, where the indication information is used to indicate to delete the current measurement window configuration or the measurement object configuration in which the current measurement window configuration is located; and the processor 1010 is configured to delete, based on the indication information, the current measurement window configuration or the measurement object configuration in which the current measurement window configuration is located.

Optionally, in some embodiments, the processor 1010 is configured to use the new measurement window configuration after the current measurement window configuration or the measurement object configuration in which the current measurement window configuration is located is deleted.

Optionally, in some embodiments, the processor 1010 is configured to update an offset of a window indicated by the current measurement window configuration.

Optionally, in some embodiments, the transceiver 1030 is configured to receive a new measurement window configuration, where the new measurement window configuration corresponds to a part of configuration information in the current measurement window configuration; and the processor 1010 is configured to: update the part of configuration information in the current measurement window configuration based on the new measurement window configuration; and delete or update other configuration information in the current measurement window configuration.

Optionally, in this embodiment, when updating the other configuration information in the current measurement window configuration, the processor 1010 is specifically configured to: obtain a timing offset between the first cell and the second cell; and update the other configuration information in the current measurement window configuration based on the timing offset.

Optionally, in some embodiments, the current measurement window configuration is configured by the network device to which the first cell belongs.

Optionally, in some embodiments, the measurement window configuration is an SMTC.

It should be understood that the communications apparatus 1000 shown in FIG. 10 may be configured to perform an operation or a procedure related to the terminal device side in the foregoing method embodiments, and an operation and/or a function of each module in the communications apparatus 1000 are/is used to implement a corresponding procedure in the foregoing method embodiments. For brevity, details are not described herein.

Figure 11:
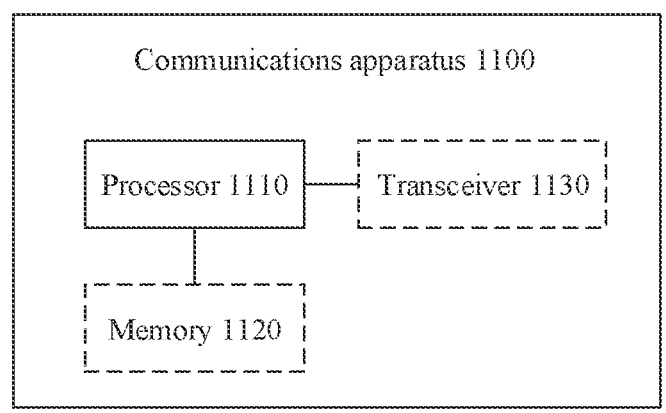
FIG. 11 is another schematic block diagram of another communications apparatus according to an embodiment of this application.

As shown in FIG. 11, an embodiment of this application further provides a communications apparatus 1100. The communications apparatus may be a network device, or may be a component (for example, a chip or a circuit) that may be used in a network device. The communications apparatus 1100 includes a processor 1110. The processor 1110 is configured to perform the method on the network device side in the foregoing method embodiments.

Optionally, in this embodiment, the communications apparatus 1100 may further include a memory 1120. The memory 1120 is configured to store an instruction, the processor 1110 is configured to execute the instruction stored in the memory 1120, and execution of the instruction stored in the memory 1120 enables the processor 1110 to perform the method on the network device side in the foregoing method embodiments.

For example, the memory 1120 may be further configured to store data.

Optionally, in this embodiment, the communications apparatus 1100 may further include a transceiver 1130.

In a possible manner, the processor 1110 may control the transceiver 1130 to receive and/or send a signal.

In another possible implementation, the communications apparatus 1100 may include a processor 1110, a memory 1120, and a transceiver 1130. The processor 1110, the memory 1120, and the transceiver 1130 may communicate with each other through an internal connection path, to transfer a control and/or data signal.

For example, the memory may be further configured to store information received by the transceiver 1130.

For example, the execution of the instruction stored in the memory 1120 enables the processor 1110 to: when a serving cell of a terminal device changes from a first cell to a second cell, determine a new measurement window configuration of the terminal device based on a timing of the second cell; and the transceiver 1130 is configured to send the new measurement window configuration to the terminal device.

The new measurement window configuration is sent to the terminal device, so that the terminal device may update a current measurement window configuration based on the new measurement window configuration. It should be understood that, when the serving cell of the terminal device changes, the current measurement window configuration of the terminal device is updated, so that a problem that the current measurement window configuration of the terminal device is not applicable to a current measurement task can be resolved to some extent.

Optionally, in some embodiments, the transceiver 1130 is configured to send a radio resource control RRC reconfiguration message to the terminal device, where the RRC reconfiguration message carries the new measurement window configuration.

Optionally, in some embodiments, the measurement window configuration is an SMTC.

Optionally, in some embodiments, that a serving cell of a terminal device changes from a first cell to a second cell includes: The terminal device performs cell handover; or the terminal device performs RRC connection re-establishment.

It should be understood that the communications apparatus 1100 shown in FIG. 11 may be configured to perform an operation or a procedure related to the network device side in the foregoing method embodiments, and an operation and/or a function of each module in the communications device 1100 are/is used to implement a corresponding procedure in the foregoing method embodiments. For brevity, details are not described herein.

For explanations and beneficial effects of related content of any one of the communications apparatuses provided above, refer to the corresponding method embodiments provided above. Details are not described herein again.

In the embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), or a memory (also referred to as a main memory). The operating system may be any one or more types of computer operating systems, for example, a Linux operating system, a Unix operating system, an Android operating system, an iOS operating system, or a Windows operating system, that implement service processing by using a process. The application layer includes applications such as a browser, an address book, word processing software, and instant messaging software. In addition, a specific structure of an execution body of the method provided in the embodiments of this application is not specifically limited in the embodiments of this application, provided that a program that records code of the method provided in the embodiments of this application can be run to perform communication according to the method provided in the embodiments of this application. For example, the execution body of the method provided in the embodiments of this application may be a terminal device or a network device, or a function module that can invoke and execute the program in a terminal device or a network device.

In addition, aspects or features of this application may be implemented as a method, an apparatus, or a product that uses standard programming and/or engineering technologies. The term "product" used in this application covers a computer program that can be accessed from any computer-readable device, carrier, or medium. For example, the computer-readable medium may include but is not limited to: a magnetic storage component (for example, a hard disk, a floppy disk, or a magnetic tape), an optical disc (for example, a compact disc (CD) or a digital versatile disc (DVD)), or a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a wireless channel, and various other media that can store, include, and/or carry an instruction and/or data.

It should be understood that, the processor mentioned in the embodiments of this application may be a central processing unit (CPU), and may further be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor or the like.

It should be further understood that the memory mentioned in the embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. According to a description that is used as an example instead of a limitation, many forms of RAMs are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that when the processor is a general purpose processor, a DSP, an ASIC, an FPGA or another programmable logic device, a discrete gate or a transistor logic device, or a discrete hardware component, the memory (a storage module) is integrated into the processor.

It should be noted that the memory described in this specification aims to include but is not limited to these memories and any memory of another proper type.

A person of ordinary skill in the art may be aware that, in combination with units and algorithm steps of the examples described in the embodiments disclosed in this specification, this application can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate components may or may not be physically separate, and components displayed as units may or may not be physical units, that is, may be located at one position, or may be distributed on a plurality of network units. Some or all of the units may be selected based on an actual requirement to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the current technology, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
    determining, by a first network device associated with a source cell, measurement timing configuration information, wherein the measurement timing configuration information comprises synchronization signal/physical broadcast channel block (SSB) information indicating an SSB to be measured in a measurement window, the SSB to be measured being indicated by a synchronization signal/physical broadcast channel block-based measurement timing configuration (SMTC); and
    sending, by the first network device and during a change of a terminal device from the source cell to a target cell, the measurement timing configuration information to a second network device associated with the target cell,
    wherein the second network device determines new measurement timing configuration information for the terminal device using the measurement timing configuration information.

2. The method according to claim 1, wherein the measurement timing configuration information is determined based on a timing of the first network device.

3. The method according to claim 2, wherein the timing of the first network device is a timing of the source cell belonging to the first network device.

4. The method according to claim 1, wherein the SSB information is represented using a bitmap.

5. The method according to claim 1, wherein a configuration parameter of the measurement window comprises a SMTC duration.

6. The method according to claim 1, wherein the SSB information is ssb-ToMeasure.

7. A communication method, comprising:
    receiving, by a second network device associated with a target cell and during a change of a terminal device from a source cell to the target cell, measurement timing configuration information from a first network device associated with the source cell, wherein the measurement timing configuration information comprises synchronization signal/physical broadcast channel block (SSB) information indicating an SSB to be measured in a measurement window, the SSB to be measured being indicated by a synchronization signal/physical broadcast channel block-based measurement timing configuration (SMTC);
    performing, by the second network device, processing based on the SSB information to determine new measurement timing configuration information; and
    sending, by the second network device, the new measurement timing configuration information to the terminal device.

8. The method according to claim 7, wherein the measurement timing configuration information is based on a timing of the first network device.

9. The method according to claim 8, wherein the timing of the first network device is a timing of the source cell belonging to the first network device.

10. The method according to claim 7, wherein the SSB information is represented using a bitmap.

11. The method according to claim 7, wherein a configuration parameter of the measurement window comprises a SMTC duration.

12. The method according to claim 7, wherein the SSB information is ssb-ToMeasure.

13. A communications system, comprising a first network device and a second network device, wherein the first network device is associated with a source cell and configured to:
    determine measurement timing configuration information, wherein the measurement timing configuration information comprises synchronization signal/physical broadcast channel block (SSB) information indicating an SSB to be measured in a measurement window, the SSB to be measured being indicated by a synchronization signal/physical broadcast channel block-based measurement timing configuration (SMTC); and
    send, during a change of a terminal device from the source cell to a target cell, the measurement timing configuration information to the second network device; and
    the second network device is associated with the target cell and configured to:
        receive the measurement timing configuration information;
        perform processing based on the SSB information to determine new measurement timing configuration information; and
        send the new measurement timing configuration information to the terminal device.

14. The system according to claim 13, wherein the measurement timing configuration information is determined based on a timing of the first network device.

15. The system according to claim 14, wherein the timing of the first network device is a timing of the source cell belonging to the first network device.

16. The system according to claim 13, wherein the SSB information is represented using a bitmap.

17. The system according to claim 13, wherein a configuration parameter of the measurement window comprises a SMTC duration.

18. The system according to claim 13, wherein the SSB information is ssb-ToMeasure.

\* \* \* \* \*